US007277126B2

United States Patent
Koizumi

(10) Patent No.: US 7,277,126 B2
(45) Date of Patent: *Oct. 2, 2007

(54) IMAGE DATA QUALITY ADJUSTMENT

(75) Inventor: Takahiko Koizumi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 817 days.

This patent is subject to a terminal disclaimer.

(21) Appl. No.: 10/618,442

(22) Filed: Jul. 11, 2003

(65) Prior Publication Data
US 2005/0007462 A1  Jan. 13, 2005

(51) Int. Cl.
*H04N 5/228* (2006.01)
(52) U.S. Cl. ............................ 348/222.1; 348/224.1; 348/345
(58) Field of Classification Search ............ 348/222.1, 348/345, 362, 252, 224.1
See application file for complete search history.

(56) References Cited

U.S. PATENT DOCUMENTS

| 5,323,204 | A  | * | 6/1994 | Wheeler et al. | ............ | 396/60 |
| 5,946,504 | A  | * | 8/1999 | Hirasawa et al. | ............ | 396/80 |
| 6,879,343 | B2 | * | 4/2005 | Yamazaki et al. | ......... | 348/351 |
| 2004/0234153 | A1 | * | 11/2004 | Nakami | ...................... | 382/254 |
| 2005/0225781 | A1 | * | 10/2005 | Koizumi | ................. | 348/231.6 |

FOREIGN PATENT DOCUMENTS

| JP | 09-116926 | 5/1997 |
| JP | 10-191246 | 7/1998 |
| JP | 2001-147481 | 5/2001 |
| JP | 2002-344989 | 11/2002 |

OTHER PUBLICATIONS

Abstract of Japanese Patent Publication No. 2002-344989, Pub. Date: Nov. 29, 2002, Patent Abstracts of Japan.
Abstract of Japanese Patent Publication No. JP 09-116926, Pub. Date: May 2, 1997, Patent Abstracts of Japan.
Abstract of Japanese Patent Publication No. JP 10-191246, Pub. Date: Jul. 21, 1998, Patent Abstracts of Japan.
Abstract of Japanese Patent Publication No. JP 2001-147481, Pub. Date: May 29, 2001, Patent Abstracts of Japan.

* cited by examiner

Primary Examiner—Vivek Srivastava
Assistant Examiner—Gevell Selby
(74) Attorney, Agent, or Firm—Martine Penilla & Gencarella, LLP

(57) ABSTRACT

A first image processing device uses image data, and image generation information that is associated with the image data and that includes at least aperture information, operating mode information, and lens focal length information at the time of generation of the image data, to perform sharpness adjustment of the image data on the basis of the aperture information, the operating mode information, and lens focal length information included in the image generation information. A second image processing device analyzes image data to obtain a sharpness characteristic value indicating a characteristic relating to sharpness of the image represented by the image data; and uses image data, and image generation information that is associated with the image data and that includes at least aperture information and operating mode information, to perform sharpness adjustment of the image data on the basis of the sharpness characteristic value, together with the aperture information and the operating mode information included in the image generation information.

18 Claims, 21 Drawing Sheets

| Tag name | Parameter value |
|---|---|
| Exposure time | 1/137 sec. |
| Aperture value | F8 |
| Exposure program | 3 |
| Lens focal length | 20.70 (mm) |
| Scene type | standard mode |

●
●
●
●
●

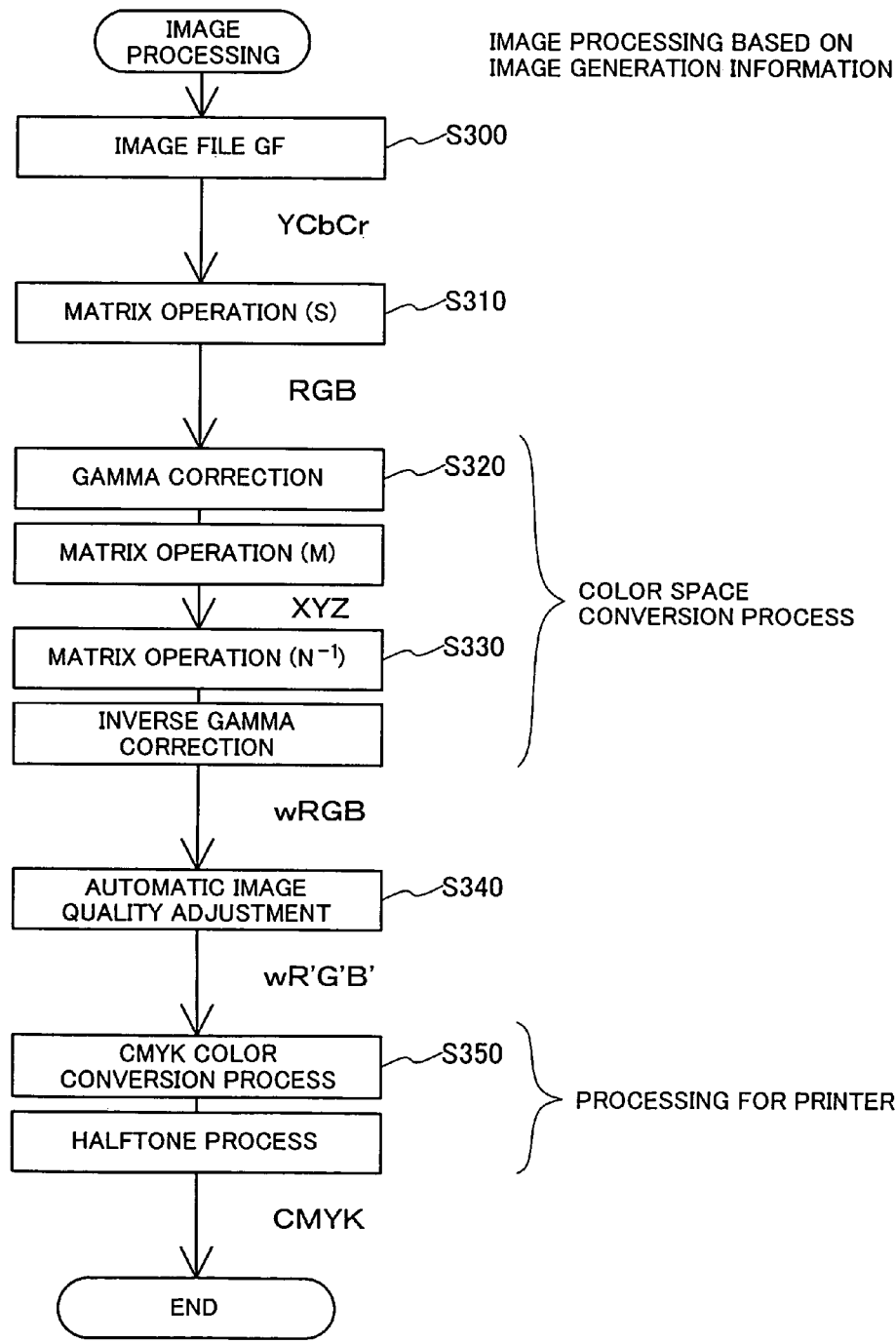

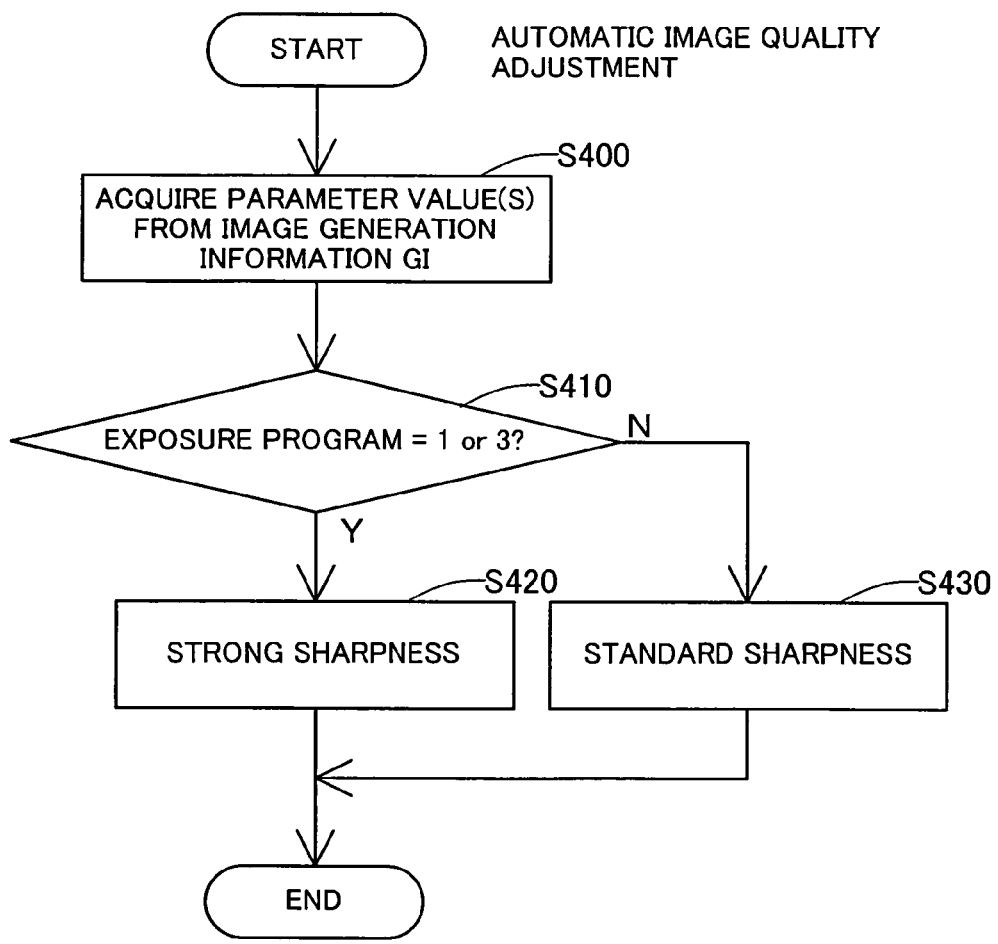

IMAGE DATA QUALITY ADJUSTMENT

BACKGROUND OF THE INVENTION

1. Field of the Invention

The present invention relates to an image quality adjustment technique for adjusting image data.

2. Description of the Related Art

The quality of image data generated by a digital still camera (DSC), digital video camera (DVC) or the like can be adjusted as desired using an image retouching application on a personal computer. An image retouching application is typically equipped with an image adjusting function for automatically adjusting the quality of image data; by using this image adjusting function, the quality of an image output by an output device can be improved. CRTs, LCDs, printers, projectors, and television receivers, for example, are known as image output devices.

A printer driver, which controls the operation of one of these output devices, namely, a printer, is also equipped with a function for automatically adjusting image quality, and the quality of printed images can be improved using such a printer driver as well.

However, the automatic image quality adjusting function provided by an image retouching application or printer driver executes quality correction suitable for image data having standard image characteristics. On the other hand, image data being subjected to image processing can be produced under various conditions, so in some instances quality cannot be improved by executing a same given automatic image quality adjusting function.

For example, where a landscape, commemorative photo, or other image is output, a sharp image that is in focus over the entire image plane from foreground to background is desirable. For this purpose, it is common to step down the aperture (increase the aperture value), and set operating mode, for example, the exposure mode, to aperture priority mode in which user-set aperture value has priority, or to manual mode. However, even where image correction suitable for image data having standard image characteristics is performed on such image data, adequate sharpness cannot be achieved in some instances. This problem is not limited to DSCs, and is a problem common to DVCs and other such image producing devices.

SUMMARY OF THE INVENTION

The present invention has as an object to carry out appropriate automatic adjustment of image quality depending on the individual set of image data.

In order to attain at least part of the aforementioned object, the first image processing device according to this invention is an image processing device that performs image processing using image data generated by an image generator, and image generation information that is associated with the image data and that includes at least aperture information, operating mode information, and lens focal length information at the time of generation of the image data, and the device comprises an image quality adjuster that, on the basis of the aperture information, operating mode information, and lens focal length information included in the image generation information, adjusts the sharpness of the image data.

This first image processing device can adjust image data to proper sharpness on the basis of aperture information, operating mode information, and lens focal length information at the time of generation of the image data.

The second image processing device according to this invention is an image processing device that performs image processing using image data generated by an image generator, and image generation information that is associated with the image data and that includes at least aperture information and operating mode information at the time of generation of the image data, and the device comprises an image quality adjuster that analyzes the image data to acquire a sharpness characteristic value indicating a characteristic relating to sharpness of the image represented by the image data, and that adjusts the sharpness of the image data on the basis of the sharpness characteristic value, together with the aperture information and operating mode information included in the image generation information.

This second image processing device can adjust image data to proper sharpness on the basis of aperture information and lens focal length information at the time of generation of the image data, together with a sharpness characteristic value of the image data.

This invention can be realized in various modes including: an image output method and image output device; an image data processing method and image data processing device; a computer program for realizing functions of such a method or device; a storage medium having such a computer program stored thereon; and a data signal containing such a computer program embedded within a carrier wave.

These and other objects, features, embodiments, and advantages of the present invention will be apparent from the following description of the preferred embodiments set forth hereinbelow together with drawings.

BRIEF DESCRIPTION OF THE DRAWINGS

FIG. 5 is an explanatory diagram describing an example of data structure in an Exif data field.

FIG. 10 is a flowchart showing a processing routine for image processing based on image generation information.

FIG. 12 is a flowchart showing a processing routine for automatic image quality adjustment processing.

DESCRIPTION OF THE PREFERRED EMBODIMENTS

Figure 1:
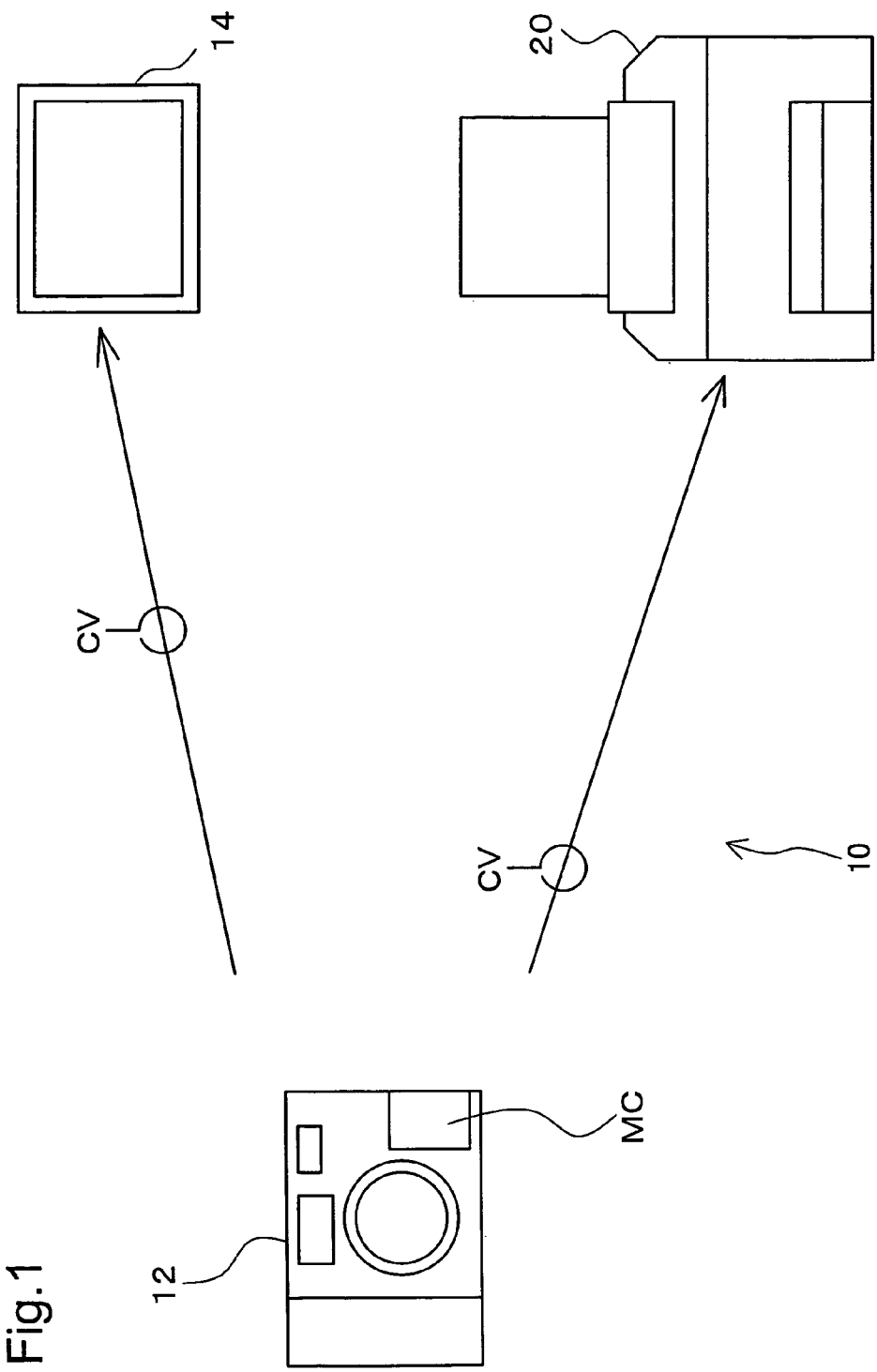
FIG. 1 is a block diagram showing the arrangement of an image output system as an embodiment of the invention.

The description hereinbelow of the embodiments of the invention on the basis of examples is made in the following order.
A. Arrangement of Image Output System
B. Arrangement of Image file
C. Arrangement of Image data Output Device
D. Image Processing in Digital Still Camera
E. Image Processing in Printer
F. Embodiments of Sharpness Adjustment Process
G. Embodiments of Automatic Image Quality Adjustment Process
H. Arrangement of Image data Output System Employing Image data Processing Device
I. VARIANT EXAMPLES A. Arrangement of Image Output System:

FIG. 1 is an illustration of an example of an image data output system implementing an output device (hereinafter referred to also as an image data output device) as an embodiment of the invention. Image data output system 10 comprises a digital still camera 12 as an image data generating device for generating image files; and a printer 20 as an image output device. Image files generated by digital still camera 12 are transferred to printer 20 via a cable CV, or by directly inserting into printer 20 a memory card MC on which image files are stored. Printer 20 executes image quality adjustment processing of image data based on read out image files, and outputs the images. As the output device, a CRT display, LCD display, or other monitor 14, a projector, or the like could be used in addition to or instead of printer 20. The following description is based on the use of a printer 20 comprising an image quality adjuster and an image output section as the output device, with a memory card MC being inserted directly into the printer 20.

Figure 2:
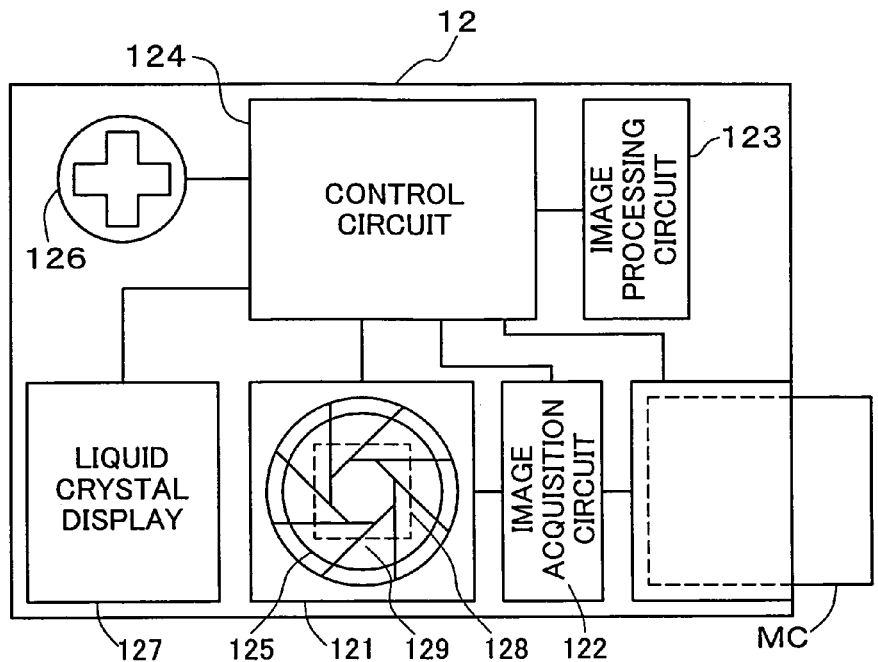
FIG. 2 is a block diagram showing a simplified arrangement of a digital still camera 12.

FIG. 2 is a block diagram showing a simplified arrangement of a digital still camera 12. The digital still camera 12 of this embodiment comprises an optical circuit 121 for capturing optical information; an image acquisition circuit 122 for controlling the optical circuit to acquire an image; an image processing circuit 123 for processing acquired digital images; a flash 130 serving as a supplemental light source; and a control circuit 124 for controlling the various circuits. Control circuit 124 comprises memory, not shown. Optical circuit 121 comprises a lens 125 for collecting optical information; an aperture 129 for adjusting the amount of light; and a CCD 128 for converting optical information passing through the lens into image data.

In this embodiment, optical circuit 121 and image acquisition circuit 122 correspond to the "image generator" in the invention.

Digital still camera 12 stores acquired images on a memory card MC. The typical storage format of image data in digital still camera 12 is the JPEG format, but other storage formats, such as TIFF format, GIF format, BMP format, or RAW data format could be used.

Digital still camera 12 comprises a Select/Set button 126 for setting various shooting parameters (aperture value, shutter speed, exposure adjustment mode, shooting mode, lens focal length, etc.); and a liquid crystal display 127. Liquid crystal display 127 is used to preview photographed images, and when setting the aperture or other parameters using the Select/Set button 126. Aperture value may be set to values within a range predetermined with reference to the model of digital still camera 12; for example, it may be set to certain predetermined discrete numbers from 2 to 16 (e.g., 2, 2.8, 4, 5.6 . . . etc.). F number is typically used for aperture value. Accordingly, a larger aperture value means a smaller aperture. Shutter speed can also be set to values within a predetermined range, for example, values from $\frac{1}{15}$ second to $\frac{1}{250}$ second. As exposure adjustment mode, there can be selected one of a number of modes set in advance, for example, program auto (normal program mode), aperture priority mode, shutter speed priority mode, manual mode, etc. When set to program auto mode, aperture value and shutter speed are adjusted automatically to standard values, in order to set exposure to a standard value. When set to manual mode, user-set aperture value and shutter speed are used. An arrangement whereby, with aperture value and shutter speed set by the user, an exposure adjustment mode using those setting is selected is also possible. Shooting mode includes a number of modes, such as standard mode, human figure mode (portrait mode), landscape mode, night mode, or other preset mode, selected to match a particular type of subject or the like. Where shooting mode has been selected by the user, related parameters (aperture value, lens focal length, etc.) are set automatically depending on the selected shooting mode. For example, where standard mode has been selected as the shooting mode, parameters relating to generation of image data are set to standard value regardless of aperture value. Standard shooting conditions with aperture value set to a standard value (for example, shooting conditions in program auto of the exposure adjustment mode, or shooting conditions in the standard shooting mode) are the default shooting conditions in digital still camera 12. Standard shooting conditions are frequently used as settings at the time of purchase of digital still camera 12.

Lens focal length is information relating to the distance between the lens center and the focal point, i.e. film, CCD, or other photoreceptor element, and can be set to a value within a predetermined range set in advance depending on the type of lens used. By adjusting lens focal length to a larger value, the user can produce an image in which the subject appears larger. Lens focal length is typically expressed in mm units.

When a photograph has been taken with a digital still camera 12, image data and image generation information are stored as an image file in memory card MC. Image generation information can include aperture value and other parameter settings at the time of shooting (time of generation of image data) as described later in detail.

Figure 3:
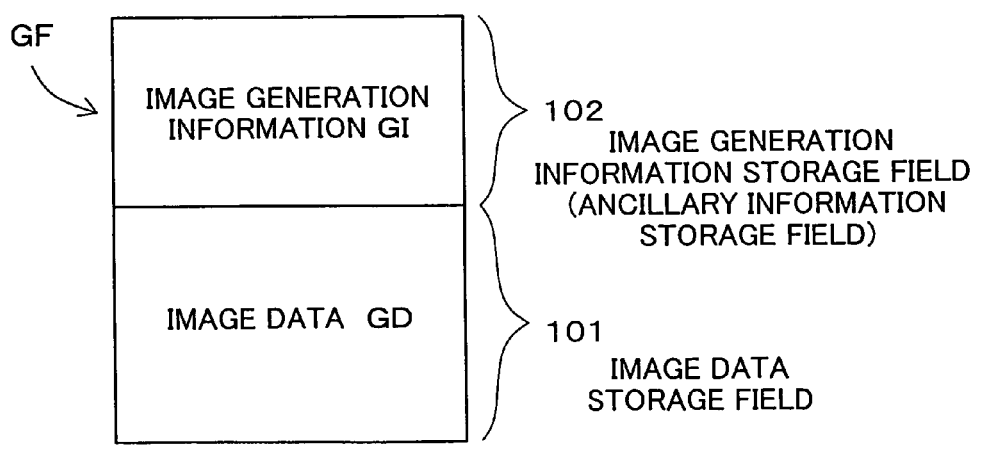
FIG. 3 is an explanatory diagram conceptually illustrating an example of an arrangement within an image file that can be used in this embodiment.

B. Arrangement of Image File:

FIG. 3 is an explanatory diagram conceptually illustrating an example of an arrangement within an image file that can be used in this embodiment. Image file GF comprises an image data storage field 101 for storing image data GD; and an image generation information storage field 102 for storing image generation information GI. Image data GD is stored, for example, in JPEG format, while image generation information GI is stored, for example, in TIFF format (a format in which data and data fields are specified using tags). The terms "file structure" and "data structure" in this embodiment refer to file or data structure in the form in which a file or data etc. is stored in a memory device.

Image generation information GI is information relating to an image when the image data is generated (shot) by digital still camera 12 or other such image generating device, and includes the following settings.
aperture value
shutter speed
exposure time
lens focal length
exposure adjustment mode
shooting mode
maker name
model name
gamma value The image file GF in this embodiment may basically include an image data storage field 101 and an image generation information storage field 102; or may have a file structure according to an existing standardized file format. The following specific description pertains to the case where the image file GF pertaining to this embodiment conforms to the Exif file format.

An Exif file has a file structure in accordance with the digital still camera image file format specification (Exif); the specification has been proposed by the Japan Electronics and Information Technology Industries Association (JEITA). Similar to the conceptual diagram in FIG. 3, the Exif file format includes a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the image generation information storage field 102. The ancillary information storage field stores image generation information relating to a JPEG image, such as shooting date/time, aperture value, and shutter speed.

Figure 4:
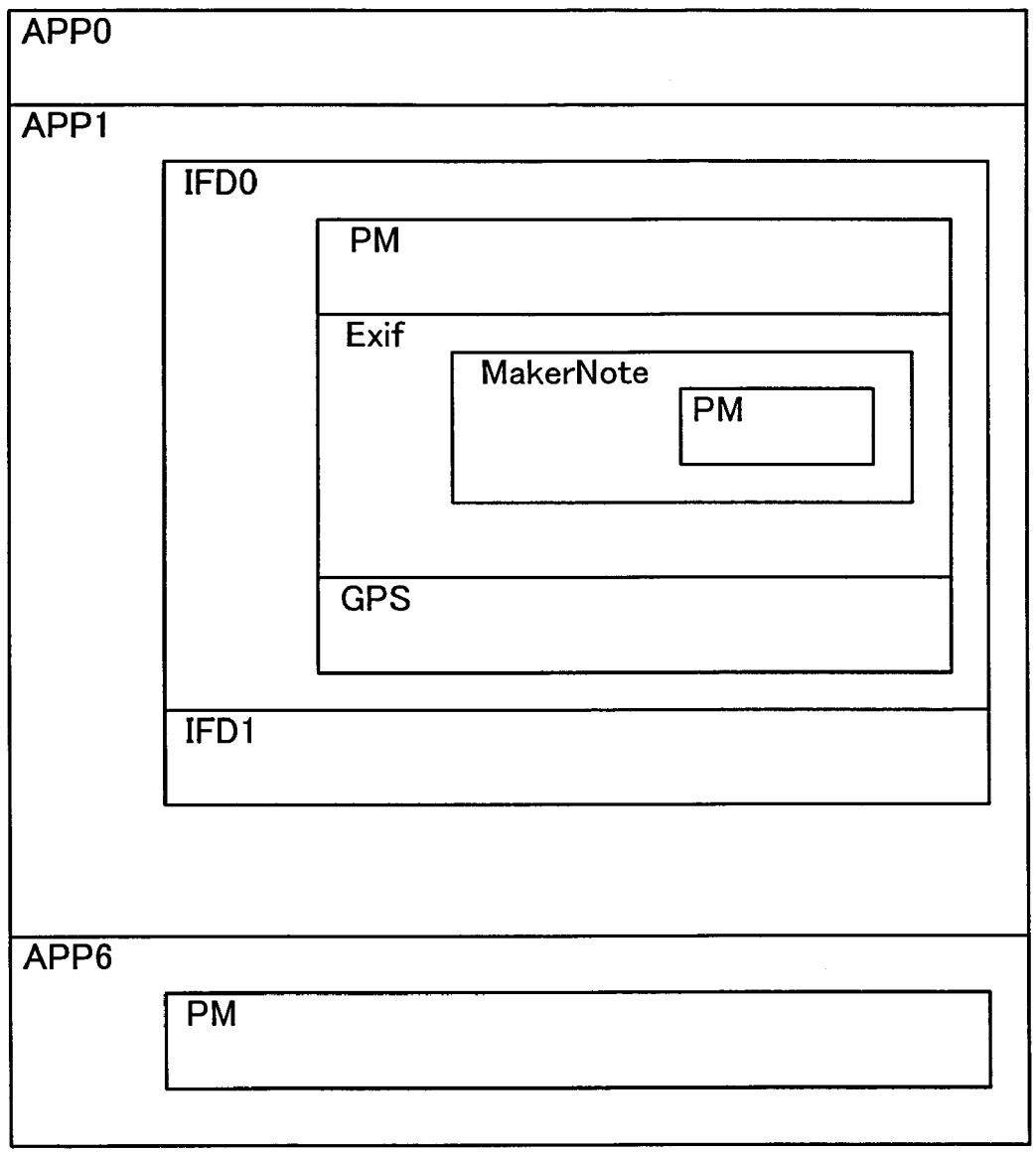
FIG. 4 is an explanatory diagram describing an example of data structure of an ancillary information storage field 103.

FIG. 4 is an explanatory diagram describing an example of data structure of ancillary information storage field 103. In the Exif file format, hierarchical tags are used to designate data fields. Each data field contains within it a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are contained. The APP1 data field contains within it two data fields whose tag names are IFD0 and IFD1. The IFD0 data field contains three data fields whose tag names are PM, Exif, and GPS. Data and data fields are stored according to a prescribed address or offset value; address or offset value can be searched by means of tag name. On the output device end, data corresponding to desired information can be acquired by means of specifying an address or offset value corresponding to the desired information.

FIG. 5 is an explanatory diagram describing an example of data structure (data tag names and parameter values) in the Exif data field in FIG. 4, wherein tag name can be referenced by tracing in the order APP1-IFD0-Exif. As shown in FIG. 4, the Exif data field can include a data field whose tag name is MakerNote; the MakerNote data field can in turn include a plurality of items of data, although these are omitted in FIG. 5.

As shown in FIG. 5, the Exif data field stores parameter values relating to information such as exposure time, aperture value, exposure program, lens focal length, scene type, etc. Aperture value can be used as aperture information. Exposure program and scene type can be used as operating mode information.

Exposure program is information that identifies an exposure adjustment mode, can be selected from among a number of values including the following four values, for example.
Parameter value 1: manual mode
Parameter value 2: program auto mode
Parameter value 3: aperture priority mode
Parameter value 4: shutter speed priority mode Scene type is information that identifies a shooting mode, and is set by selecting from among, for example, standard mode, human figure mode (portrait mode), landscape mode, and night mode.

Information associated with image data is also stored appropriately in fields other than the Exif data field in FIG. 4. For example, maker name and model name are stored in the data field whose tag name is IFD0, as information identifying the image generating device.

Figure 6:
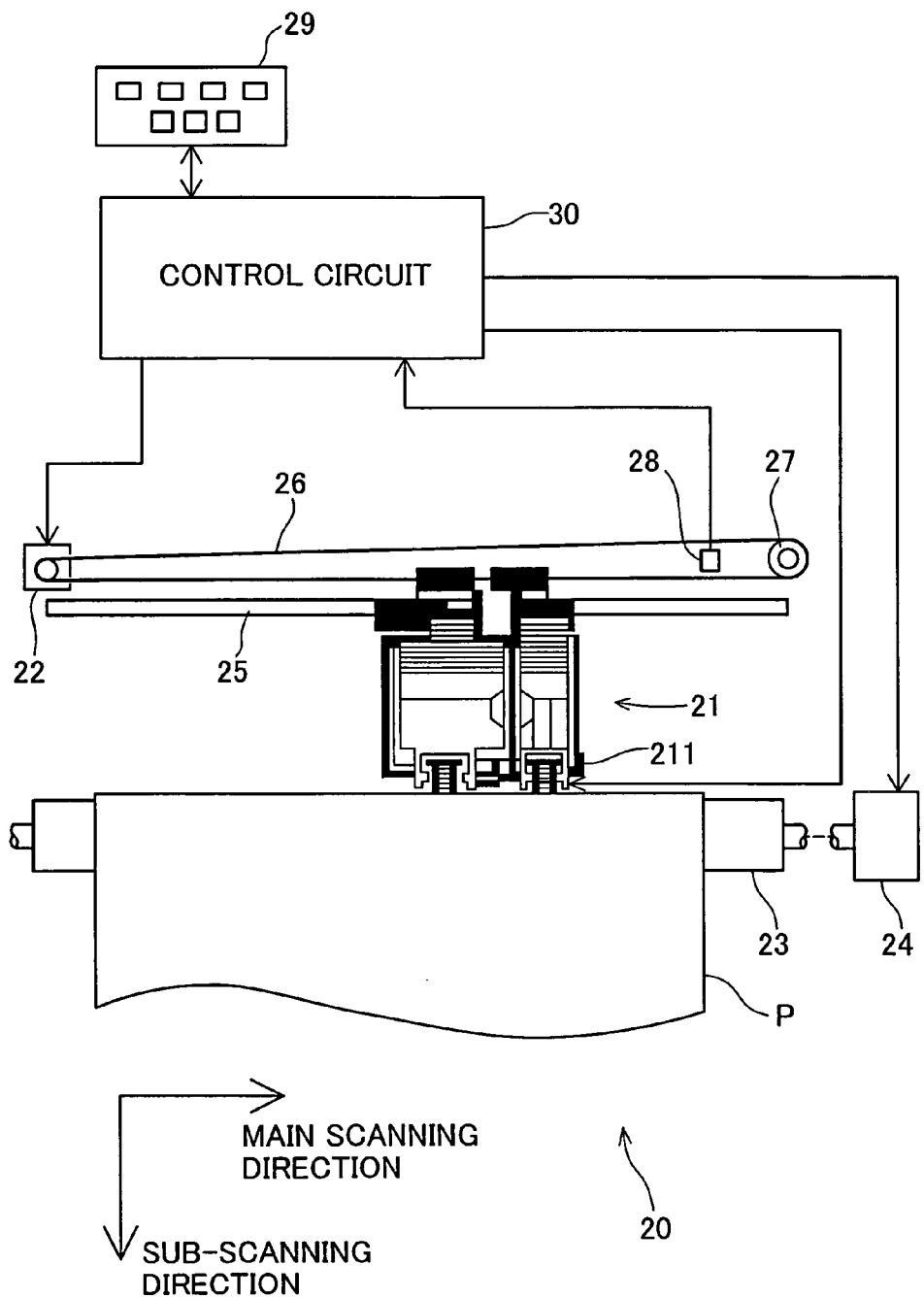
FIG. 6 is a block diagram showing a simplified arrangement of a printer 20.

C. Arrangement of Image Output System Capable of Using Image File:

FIG. 6 is a block diagram showing a simplified arrangement of printer 20 in the present embodiment. Printer 20 is a printer capable of image output, for example, an ink jet printer that ejects ink of four colors, cyan C, magenta Mg, yellow Y, and black K, on a print medium to produce a dot pattern. An electrophotographic printer that transfers and fixes toner onto a print medium may also be used. In addition to the four colors indicated above, light cyan LC which is lighter in density than cyan C, light magenta LM which is lighter in density than magenta Mg, dark yellow DY which is darker in density than yellow Y may be used as ink. Where monochromatic printing is performed, the arrangement may employ black K only; or red R or green G may be used. The type of ink or toner used can be selected depending on the characteristics of the image for output.

As shown in the drawing, printer 20 comprises a mechanism for driving a print head 211 mounted on a carriage 21, to eject ink and form dots; a mechanism for reciprocating carriage 21 in the axial direction of a platen 23; a mechanism for feeding printer paper P by means of a paper feed motor 24; and a control circuit 30. By means of these mechanisms, printer 20 functions as an image output device. The mechanism for reciprocating carriage 21 in the axial direction of a platen 23 is composed of a slide rail 25 extending parallel to the axis of platen 23, for slidably supporting carriage 21; a pulley 27 coupled via an endless drive belt 26 to a carriage motor 22; and a position sensor 28 for sensing the home position of carriage 21. The mechanism for feeding printer paper P is composed of platen 23; paper feed motor 24 which rotates platen 23; an auxiliary paper feed roller, not shown in the drawing; and a gear train (not shown) for transmitting rotation of paper feed motor 24 to platen 23 and the auxiliary paper feed roller.

Control circuit 30 exchanges signals with a printer control panel 29 while appropriately controlling operation of paper feed motor 24, carriage motor 22, and print head 211. Printer paper P supplied to printer 20 is set pinched between platen 23 and the auxiliary paper feed roller, and advanced by a predetermined amount depending on the rotation angle of platen 23.

Carriage 21 has a print head 211, and enables mounting of an ink jet cartridge of utilizable ink. On the bottom face of print head 211 are disposed nozzles for ejecting utilizable ink (not shown).

Figure 7:
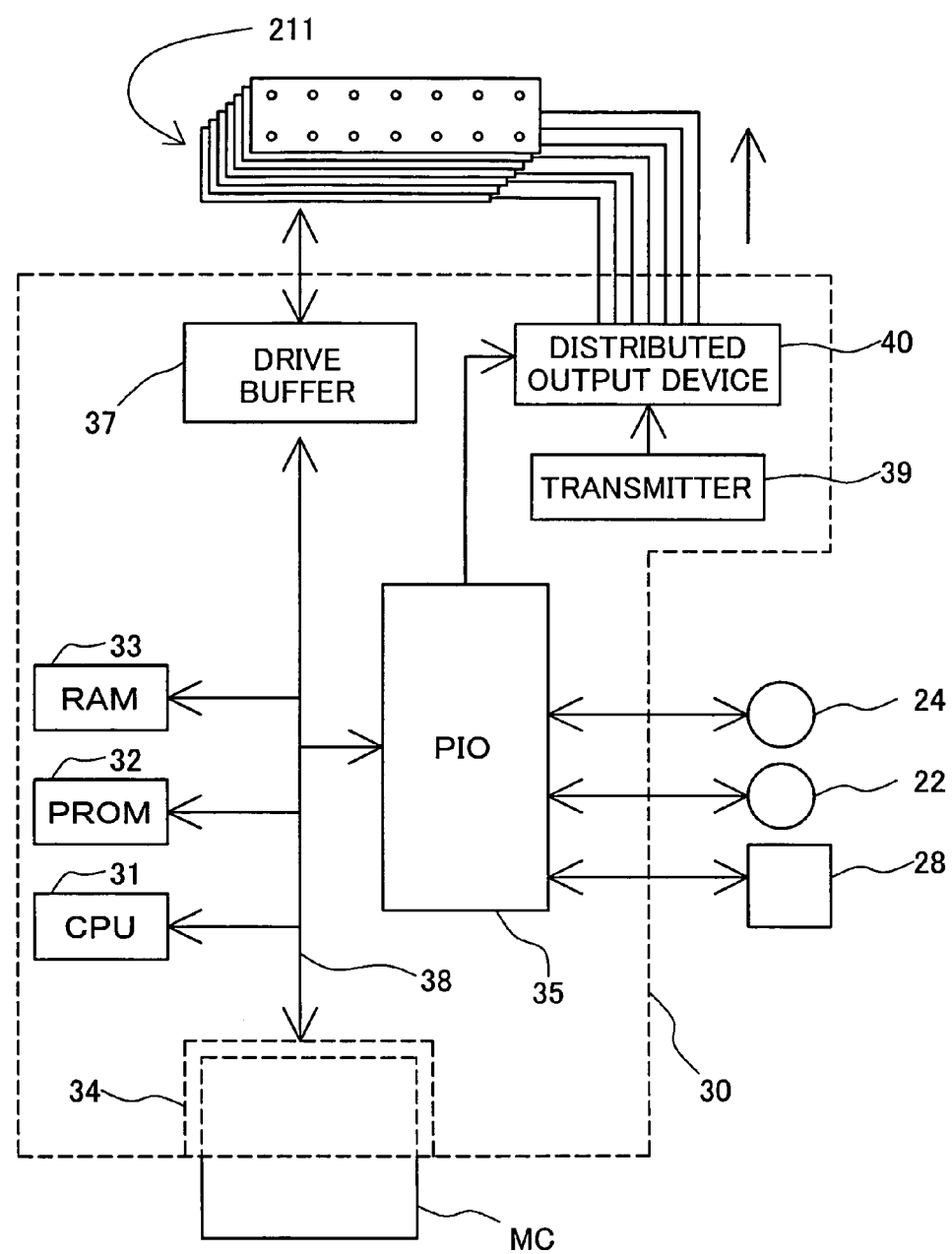
FIG. 7 is a block diagram showing an arrangement of printer 20, centered on the control circuit 30 of printer 20.

FIG. 7 is a block diagram showing an arrangement of printer 20, centered on the control circuit 30 of printer 20. Within control circuit 30 are disposed a CPU 31, PROM 32, RAM 33, a memory card slot 34 for acquiring data from a memory card MC, a peripheral device input/output (PIO) 35 for exchanging data with paper feed motor 24, carriage motor 22, etc., a drive buffer 37, and the like. Drive buffer 37 is used as a buffer for supplying dot on/off signals to print head 211. These components are interconnected to a bus 38, enabling exchange of data among them. Control circuit 30 is also provided with a transmitter 39 for outputting a drive waveform at predetermined frequency, and a distributed output device 40 for distributing the output of transmitter 39 to print head 211 at predetermined timing.

Control circuit 30, while synchronizing with operations of paper feed motor 24 and carriage motor 22, outputs dot data to drive buffer 37 at predetermined timing. Control circuit 30 also reads image files from memory card MC, analyzes the ancillary information, and performs image processing based on the image generation information acquired thereby. That is, control circuit 30 functions as an image quality adjuster. The flow of image processing executed by control circuit 30 will be described in detail hereinafter.

In the present embodiment, drive buffer 37, transmitter 39, distributed output device 40, and print head 211 function as an "image output section (or image forming section)" for outputting an image in response to image data. CPU 31 functions as a "data output section" for outputting quality-adjusted image data to the "image output section".

Figure 8:
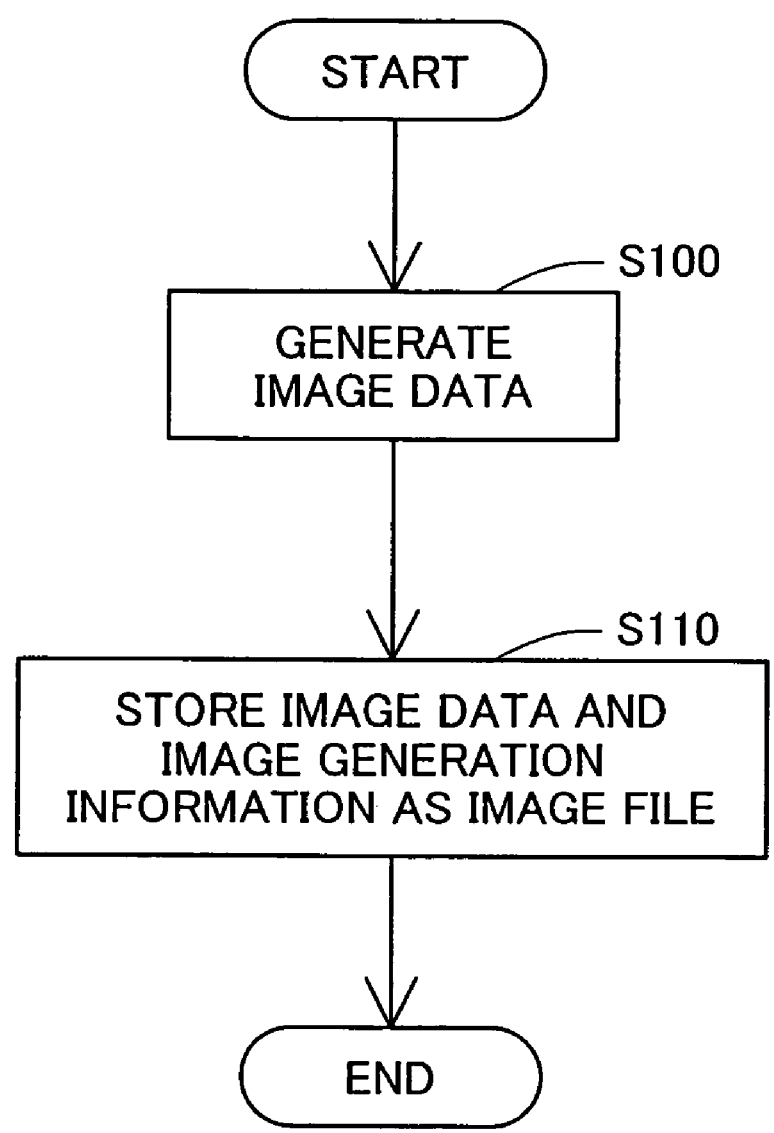
FIG. 8 is a flowchart showing a process flow for generating an image file GF in digital still camera 12.

D. Image Processing in Digital Still Camera:

FIG. 8 is a flowchart showing a process flow for generating an image file GF in digital still camera 12.

Control circuit 124 (FIG. 2) of digital still camera 12 generates image data GD in response to a shoot request, for example, depression of a shutter button (Step S100). Where aperture value, exposure adjustment mode, shooting mode and other parameter value settings have been made, image data GD is generated using the set parameter values.

Control circuit 124 stores the generated image data GD and image generation information GI as an image file GF on memory card MC (Step S10), and terminates the processing routine. Image generation information GI includes parameters used at the time of image generation, such as aperture value, shutter speed, etc.; exposure adjustment mode, shooting mode and/or other arbitrarily set parameter values; and parameter values set automatically, such as maker name, model name, and the like. Image data GD is also stored in the image file GF after being converted from the RGB color space to the YCbCr color space, and compressed in JPEG format.

By means of the aforementioned processes executed in digital still camera 12, both image data GD and image generation information GI that includes various parameter values at the time of generation of image data are set in the image file GF stored on memory card MC.

Figure 9:
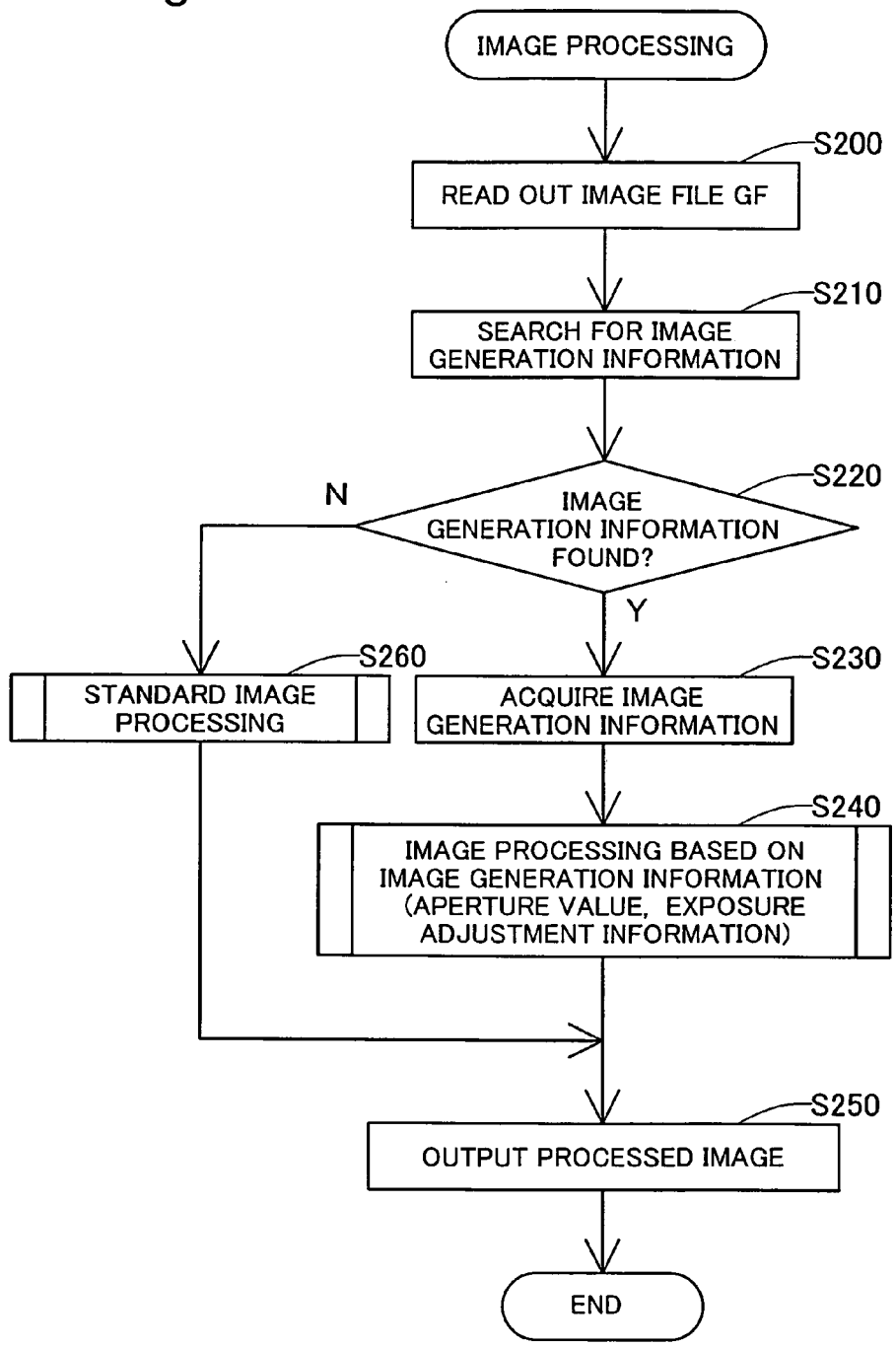
FIG. 9 is a flowchart showing a processing routine for image processing in printer 20.

E. Image Processing in Printer:

FIG. 9 is a flowchart showing a processing routine for image processing in printer 20 of the present embodiment. The following description is made where a memory card MC having an image file GF stored thereon is inserted directly into printer 20. When memory card MC has been inserted into memory card slot 34, the CPU 31 of control circuit 30 (FIG. 7) of printer 20 reads out the image file GF from memory card MC (Step S200). Next, in Step S210, CPU 31 searches in the ancillary information storage field of image file GF for image generation information GI which indicates information at the time that the image data was generated. In the event that image generation information GI is found (Step S220: Yes), CPU 31 acquires and analyzes the image generation information GI (Step S230). On the basis of the analyzed image generation information GI, CPU 31 executes image processing, described hereinbelow (Step S240), outputs the processed image (Step S250), and terminates the processing routine.

An image file created by a drawing application or the like, on the other hand, will not contain image generation information GI having information such as aperture value and the like. If CPU 31 cannot find image generation information GI (Step S200: No), it performs standard processing (Step S260), outputs the processed image (Step S250), and terminates the processing routine.

FIG. 10 is a flowchart showing a processing routine for image processing (corresponding to Step S240 in FIG. 9) based on image generation information. The CPU 31 of control circuit 30 (FIG. 7) of printer 20 reads out image data GD from the read out image file GF (Step S300)

As mentioned previously, digital still camera 12 stores image data GD as JPEG format files, and in a JPEG format file image data is stored using an YCbCr color space. In Step S310, CPU 31 executes an operation using 3×3 matrix S to convert image data based on an YCbCr color space into image data based on an RGB color space. This matrix operation is represented by the following arithmetic expression, for example.

$$\begin{pmatrix} R \\ G \\ B \end{pmatrix} = S \begin{pmatrix} Y \\ Cb - 128 \\ Cr - 128 \end{pmatrix} \quad \text{[Eq. 1]}$$

$$S = \begin{pmatrix} 1 & 0 & 1.40200 \\ 1 & -0.34414 & -0.71414 \\ 1 & 1.77200 & 0 \end{pmatrix}$$

Where the color space of image data generated by digital still camera 12 is wider than a predetermined color space, for example, the sRGB color space, image data based on the RGB color space obtained in Step S310 may in some instances contain valid data that is outside the defined area of the RGB color space. Where image generation information GI instructs this out-of-defined area data to be handled as valid data, the out-of-defined-area data will be kept, and subsequent image processing continues. In the absence of an instruction to handle out-of-defined-area data as valid data, out-of-defined area data is clipped to the defined area. For example, where the defined area is 0 –255, negative value data of less than 0 is rounded to 0, and data above 255 to 255. In the event that the color space that is utilizable by the image output section is not wider than a predetermined color space, for example, the sRGB color space, it is preferably to clip it to the defined area, regardless of any instruction in the image generation information GI. Such instances would include, for example, cases where image is output to a CRT, whose available color space is the sRGB color space.

Next, in Step S320, CPU 31 performs gamma correction and an operation employing a matrix M, to convert image data based on an RGB color space to image data based on an XYZ color space. Image file GF can contain gamma value and color space information at the time of image generation. In the event that image generation information GI includes this information, CPU 31 acquires the gamma value of the image data from the image generation information GI, and executes a gamma conversion process of the image data using the acquired gamma value. CPU 31 then acquires color space information for the image data from the image generation information GI, and executes a matrix operation of the image data using a matrix M that corresponds to the color space. In the event that image generation information GI does not contain a gamma value, a gamma conversion process can be executed using a standard gamma value. A gamma value and matrix for the sRGB color space may be used respectively as this standard gamma value and matrix M. The matrix operation may be given by the following arithmetic expression, for example.

$$\begin{pmatrix} X \\ Y \\ Z \end{pmatrix} = M \begin{pmatrix} Rt' \\ Gt' \\ Bt' \end{pmatrix} \quad \text{[Eq. 2]}$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geq 0$ $$Rt' = \left(\frac{Rt}{255}\right)^\gamma \quad Gt' = \left(\frac{Gt}{255}\right)^\gamma \quad Bt' = \left(\frac{Bt}{255}\right)^\gamma$$

$Rt, Gt, Bt < 0$

-continued $$Rt' = -\left(\frac{-Rt}{255}\right)^\gamma \quad Gt' = -\left(\frac{-Gt}{255}\right)^\gamma \quad Bt' = -\left(\frac{-Bt}{255}\right)^\gamma$$

The color space of image data obtained after the matrix operation has been executed is an XYZ color space. The XYZ color space is an absolute color space, and is a device-independent color space that is not dependent on a device such as a digital still camera or printer. Thus, device-independent color matching can be carried out by means of color space conversion through the XYZ color space.

Next, in Step S330, CPU 31 performs an operation employing a matrix $N^{-1}$, and inverse gamma correction to convert image data based on the XYZ color space to image data based on the wRGB color space. During inverse gamma correction, CPU 31 acquires a printer gamma value from PROM 32, and executes inverse gamma correction of the image data using the inverse of the acquired gamma value. CPU 31 then acquires from PROM 32 a matrix $N^{-1}$ that corresponds to the conversion from the XYZ color space to the wRGB color space, and performs a matrix operation on the image data using this matrix $N^{-1}$. This matrix operation may be given by the following arithmetic expression, for example.

$$\begin{pmatrix} Rw \\ Gw \\ Bw \end{pmatrix} = N^{-1} \begin{pmatrix} X \\ Y \\ Z \end{pmatrix} \quad \text{[Eq. 3]}$$

$$N^{-1} = \begin{pmatrix} 3.30572 & -1.77561 & 0.73649 \\ -1.04911 & 2.1694 & -1.4797 \\ 0.06568289 & -0.241078 & 1.24898 \end{pmatrix}$$

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

Next, in Step S340, CPU 31 executes automatic adjustment processing of image quality. Automatic image quality adjustment processing in several embodiments involves the use of image data using image generation information contained in the image file GF (particularly the parameter values for aperture value as aperture information, exposure program as operating mode information, and lens focal length as lens focal length information), to perform automatic image quality adjustment processing in order to adjust the sharpness image data. Sharpness adjustment and automatic image quality adjustment processing are described later.

Next, in Step S350, CPU 31 executes a CMYK color conversion process and a halftone process for the purpose of printing. In the CMYK color conversion process, CPU 31 refers to a look-up table (LUT), stored in PROM 32, for conversion from the wRGB color space to the CMYK color space, and converts the color space of the image data from the wRGB color space to the CMYK color space. That is, image data consisting of RGB multi-level values is converted to image data for use by printer 20, consisting, for example, of multi-level values for six colors, C (Cyan), M (Magenta), Y (Yellow), K (Black), LC (Light Cyan), and LM (Light Magenta).

In the halftone process, CPU 31 executes a so-called halftone process to produce halftone image data from the color-converted image data. This halftone image data is sequenced in the order of transmission to drive buffer 37

(FIG. 7) to produce the final print data, whereupon the processing routine terminates. Image data processed by means of this processing routine is output in Step S250 of the image processing routine shown in FIG. 9.

F. Embodiments of Sharpness Adjustment Process:

For sharpness adjustment, processing employing an unsharp mask can be used. FIGS. 11(a)-11(d) are conceptual diagrams describing a method for adjusting sharpness using an unsharp mask. Sharpness adjustment is described in stepwise fashion, using brightness values of pixels lined up on a straight line.

Figure 11A:
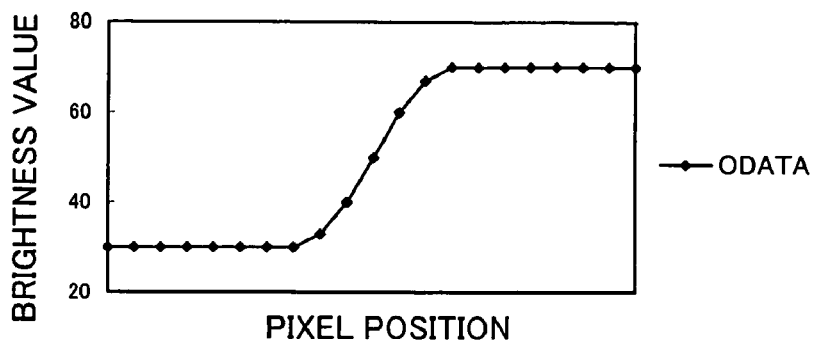
FIGS. 11(a)-11(d) are conceptual diagrams describing a method for adjusting sharpness using an unsharp mask.

FIG. 11(a) shows original data ODATA prior to performing sharpness adjustment. The vertical axis represents the brightness value of each pixel; in this example, values from 0 to 100 may be assumed. The horizontal axis represents pixel position; one marker represents one pixel within a number of pixels lined up on a straight line. That is, markers representing pixels lined up on a straight line are lined up in the horizontal axis direction according to the order in which pixels are lined up. Sharpness adjustment is described below using this original data ODATA whose brightness value changes in discrete fashion.

To increase sharpness, a method utilizing an unsharp mask can be employed. This method involves preparing data from which change in brightness value has been moderated (unsharp data), and subtracting the unsharp data from the original data in order to sharpen change in brightness value. Unsharp data can be obtained by averaging brightness value for each pixel using brightness values for surrounding pixels. As the averaging method, a method of combining the brightness value of a target pixels with the brightness values of surrounding pixels and averaging them may be used. Alternatively, a method of calculating an average while assigning greater weights to brightness values of closer (shorter distance between pixels) pixels may be used. As this weighting function (or unsharp mask), a Gaussian function centered on the target pixel may be used (since pixels in actual image data is arranged two-dimensionally, a two-dimensional Gaussian function is used).

Figure 11B:
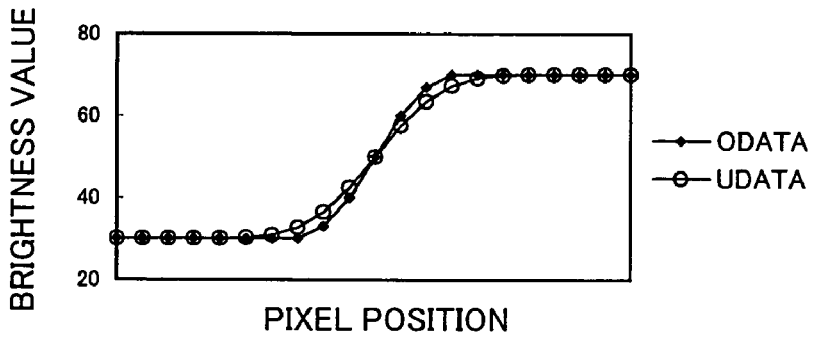

FIG. 11(b) shows brightness values of unsharp data UDATA generated using an unsharp mask. Comparing to the original data ODATA, it may be seen that change in brightness values is moderated.

Figure 11C:
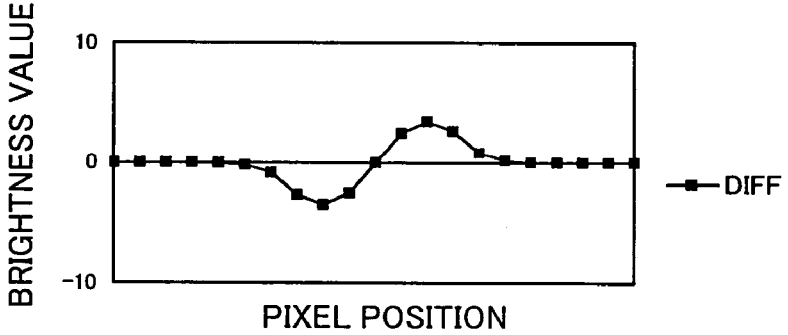
Figure 11D:
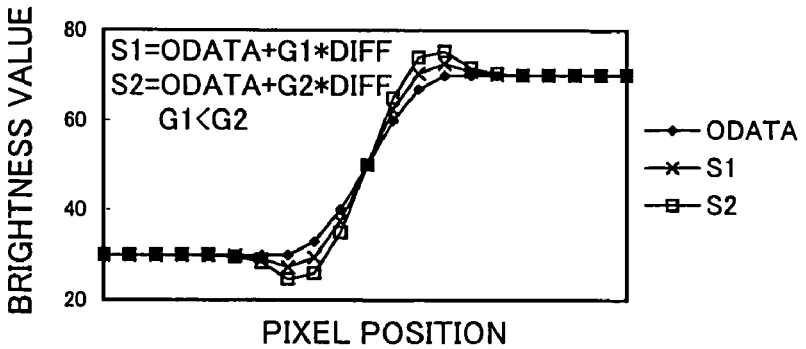

FIG. 11(c) shows difference data DIFF obtained by subtracting unsharp data UDATA from original data ODATA. By adding up data obtained by multiplying this difference data DIFF by a predetermined coefficient G with the original data ODATA, there can be obtained sharp data in which change in brightness value has been sharpened. FIG. 11(d) shows brightness values of sharp data obtained using different coefficients G. S1 indicates sharp data using a relatively small coefficient G1; S2 indicates sharp data using a relatively large coefficient G2. Both S1 and S2 have sharper change in brightness values than does the original data, and image sharpness is enhanced. As will be apparent from comparison of S1 and S2, the greater the magnitude of coefficient G, the more intensely sharpness can be adjusted. When coefficient G is set to 0, the original data ODATA and the sharp data are the same, and no sharpness adjustment is performed.

In order to attain sharpness reduction, the aforementioned unsharp data UDATA may be used as the sharpness adjusted data. In this case, the larger the width of the unsharp mask, the greater the moderation of change in brightness values in the resultant unsharp data.

By adjusting the coefficient G and the width of the unsharp mask in this manner, the degree of sharpness adjustment can be changed.

G. Embodiments of Automatic Image Quality Adjustment Process:

G1. Embodiment 1 of Automatic Image Quality Adjustment Process

FIG. 12 is a flowchart showing a processing routine for automatic image quality adjustment processing (corresponding to Step S340 in FIG. 10). CPU 31 (FIG. 7) analyzes image generation information GI, and acquires parameter values for aperture value and exposure program (Step S400). Next, in Step S410, a decision is made as to whether the aperture setting at the time of generation of the image data is the manual setting. In this embodiment, as manual settings, manual exposure adjustment mode and aperture priority exposure adjustment mode may be selected. In the case of manual mode, the exposure program (FIG. 5) value is 1; and in the case of aperture priority mode, it is 3. CPU 31 executes a decision as to whether the exposure program value is 1 or 3.

If it is decided that the exposure mode is neither manual mode nor aperture priority mode (Step S410: No), in Step S430, CPU 31 performs image adjustment wherein the degree of sharpness adjustment is standard. Where the exposure mode is either manual mode or aperture priority mode (Step S410: Yes), it is decided that since aperture value is manually set, the user intends to set the depth of field of the image to a desired level. In this instance, in Step S420, CPU 31 executes image quality adjustment of a strong sharpness adjustment when the aperture is small (the aperture value is large).

Figure 13:
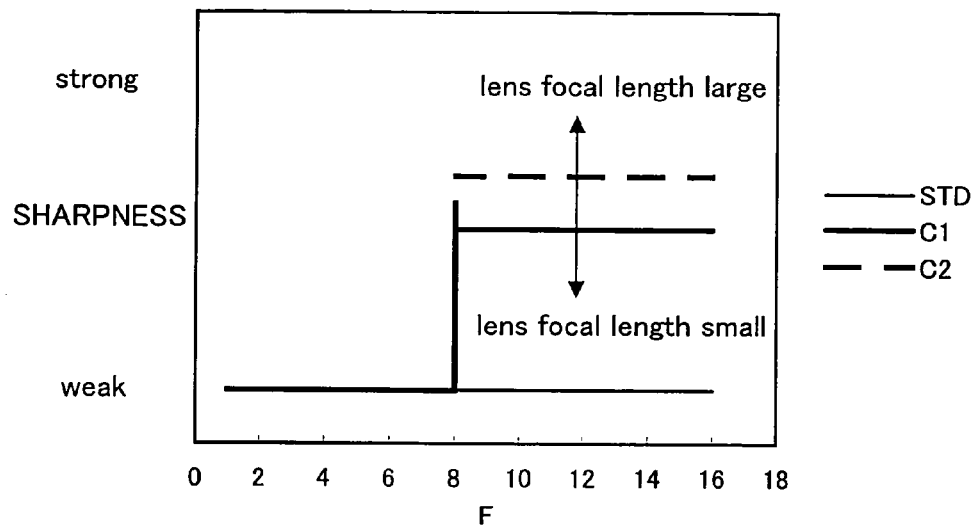
FIG. 13 is an illustration showing the relationship between the degree of sharpness adjustment and aperture value in a first embodiment of automatic image quality adjustment processing.

FIG. 13 is an illustration showing the relationship between the degree of sharpness adjustment and aperture value in a first embodiment of automatic image quality adjustment processing. The vertical axis shows the degree of sharpness adjustment (hereinafter termed sharpness intensity); a larger value means enhanced sharpness. STD indicates the sharpness intensity of image quality adjustment in the case that aperture value is set under standard shooting conditions of digital still camera 12 (hereinafter termed "standard sharpness intensity"); C1 and C2 indicate sharpness intensity of image quality adjustment with aperture value set manually (hereinafter termed "high sharpness intensity"). In this embodiment, standard sharpness intensity STD is used where the exposure adjustment mode is either program auto or shutter speed priority mode (Step S430 in FIG. 12), and high sharpness intensity C1 or C2 is used where the exposure adjustment mode is either manual mode or aperture priority mode (Step S420 in FIG. 12). Standard shooting conditions of digital still camera 12 means the default shooting conditions when digital still camera 12 is shipped from the factory, and normally correspond to shooting conditions with program auto. An arrangement wherein, in the case of shutter speed priority mode, image quality adjustment is performed at different sharpness intensity than standard sharpness intensity STD is acceptable as well.

High sharpness intensities C1, C2 are set to be greater than standard sharpness intensity STD when the aperture value is 8 or above. By so doing, when the user has set the aperture value to a large value (smaller aperture) deliberately for sharper image output, a sharp image can be output effectively. The predetermined value for the aperture value at which high sharpness intensities C1, C2 are greater than standard sharpness intensity STD is not limited to 8; it can be set to any preselected value. For example, by setting it to 4, sharper images can be output, or by setting it, for example, to 11, softer images can be output.

The two high sharpness intensities C1, C2 having different sharpness intensity are preferably used selectively depending on the size of the lens focal length. Where lens focal length at the time of generation of image data is set to a larger value, there is a higher likelihood of generating image data that will output a blurred image due to diffraction phenomenon or to chromatic aberration of the lens. This blurring of the image is not intended by the user. On the other hand, high sharpness intensity C2 is set so that sharpness intensity is greater than at high sharpness intensity C1 where the aperture value is 8 or above. Accordingly, where lens focal length is relatively large, by performing image quality adjustment using high sharpness intensity C2 which has relatively high sharpness intensity, blurredness in output images can be reduced.

As method of selectively using sharpness intensities C1, C2 depending on the size of the lens focal length, there is a method of using a threshold value that decides the size of the lens focal length. For example, an arrangement is acceptable wherein the threshold value of lens focal length is set to 50 mm, and high sharpness intensity C2 is used if the lens focal length is equal to or greater than this threshold value, and high sharpness intensity C1 is used if the lens focal length is less than the threshold value. The number of types of high sharpness intensity having different sharpness intensity is not limited to 2; three or more types of high sharpness intensity having different sharpness intensity may be used selectively depending on lens focal length. By having a greater number of types of high sharpness intensity, setting of sharpness intensity can be performed more finely in response to changes in lens focal length. Also, the magnitudes of the high sharpness intensities may be made to change continuously in response to lens focal length. In any event, by setting high sharpness intensity so that sharpness intensity increases with greater focal lens distance, output of blurry images can be reduced.

As the standard sharpness intensity STD, a value preset so as to optimize the output result of an image generated under standard conditions of digital still camera 12 (e.g. program auto) can be used. Alternatively, image sharpness can be analyzed on a per-pixel basis, and standard sharpness intensity STD adjusted on a per-pixel basis depending on the analysis results, so as to bring image sharpness into approximation with a benchmark value for sharpness. Image sharpness may be obtained, for example, as an average edge amount for all pixels where the edge amount is defined by an absolute value of a brightness difference between each pixel and a predetermined neighbor pixel. Alternatively, image sharpness may be obtained as a weighted average value using heavier weights for pixels with larger edge amounts (i.e. pixels at edges in the image). It is also acceptable to set not performing sharpness adjustment as the standard sharpness intensity STD. Where standard sharpness intensity STD is set by any of various methods in this way, high sharpness intensities C1, C2 are set so that when aperture value is set within a predetermined range (in this embodiment, where aperture value is 8 or above), they are greater than the set standard sharpness intensity STD.

High sharpness intensities C1, C2 for image quality adjustment at manual settings can be determined by comparing image data on which high sharpness image quality adjustment has been performed with image data on which standard sharpness image quality adjustment has been performed on the same original image. The comparison may be made on the basis of qualitative determination of image sharpness or responsive evaluation of output result, so as to optimize the output result of the image. For example, for the same set of image data, the output result obtained with the exposure program parameter value set to 3 (aperture priority mode) and the output result obtained with the exposure program parameter value set to 2 (program auto) can be compared to determine optimal sharpness intensity. Some image data generating devices have an operating mode that automatically adjusts various parameter values at the time of image generation to standard values, which are not limited to aperture value or exposure. For those devices, the level of sharpness adjustment intensity can be examined by means of comparing the output results at that operating mode setting with the output results of the same data at the aperture priority mode setting. In this embodiment, image quality adjustment using the same sharpness intensity is performed both where the exposure adjustment mode is manual mode and where it is aperture priority mode, but image quality adjustment could be performed with different sharpness intensities depending on exposure adjustment mode.

Sharpness intensity depending on the size of lens focal length may also be set on the basis of qualitative determination of image sharpness or sensory test of output results. For example, image quality adjustment using various different sharpness intensities for a plurality of sets of image data generated at different lens focal lengths may be performed. By comparing sharpness obtained through analysis of the resultant adjusted image data or output images based on the adjusted image data, sharpness intensity can be set for a particular lens focal length.

G2. Embodiment 2 of Automatic Image Quality Adjustment Process

Figure 14:
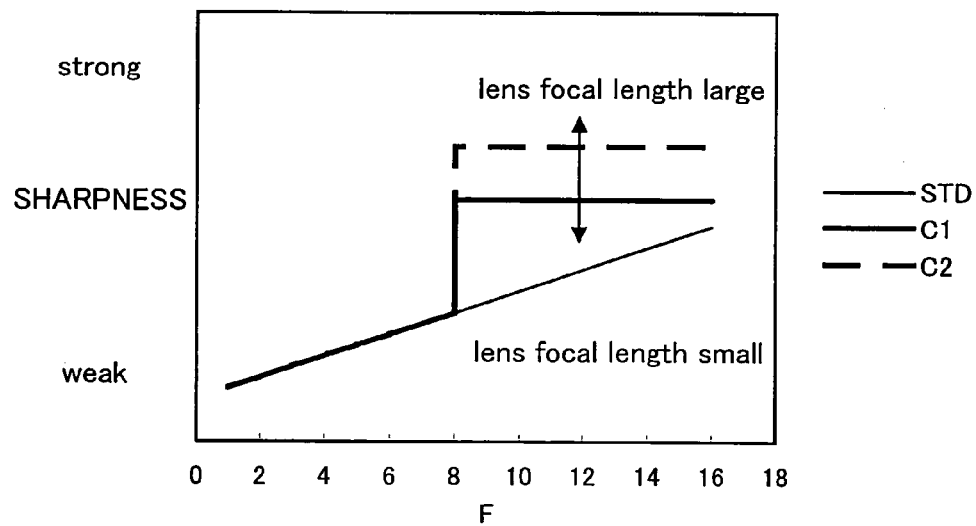
FIG. 14 is an illustration showing the relationship between the degree of sharpness adjustment and aperture value in a second embodiment of automatic image quality adjustment processing.

FIG. 14 is an illustration showing the relationship between image quality adjustment sharpness intensity and aperture value in a second embodiment of automatic image quality adjustment processing. The meaning of the vertical and horizontal axes, and the meaning of STD, C1, and C2 are the same as in FIG. 13.

Embodiment 2 differs from Embodiment 1 shown in FIG. 13 in that standard sharpness intensity STD increases continuously in association with increase in aperture value. By so doing, differences in sharpness due to aperture value can be reflected on the image even where image quality adjustment is performed at the standard sharpness intensity. Additionally, by setting high sharpness intensities C1, C2 to be higher than standard sharpness intensity STD when aperture value is equal to or greater than a predetermined value (8 in this embodiment), it is possible to accommodate user preference for sharper image output. An arrangement wherein standard sharpness intensity STD increases in stepwise fashion over a number of steps in association with increase in aperture value is acceptable as well.

G3. Embodiment 3 of Automatic Image Quality Adjustment Process

Figure 15:
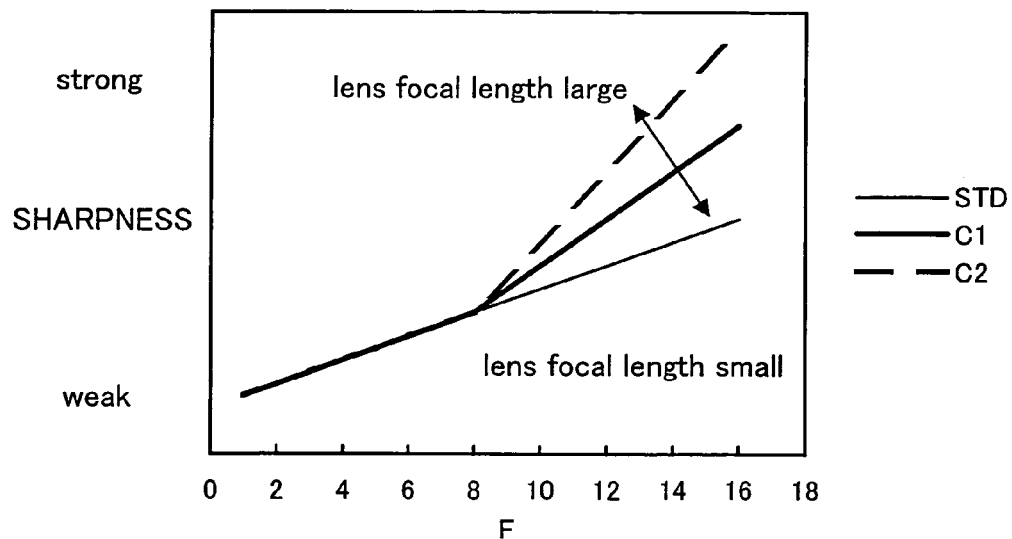
FIG. 15 is an illustration showing the relationship between the degree of sharpness adjustment and aperture value in a third embodiment of automatic image quality adjustment processing.

FIG. 15 is an illustration showing the relationship between sharpness intensity and aperture value in a third embodiment of automatic image quality adjustment processing. In Embodiment 3, in contrast to Embodiment 1 shown in FIG. 13, high sharpness intensities C1, C2 increase continuously in association with increase in aperture value where aperture value is equal to or greater than a predetermined value (8 in this embodiment). By so doing, sharpness enhancement processing can be performed more finely on the basis of aperture value. An arrangement wherein high sharpness intensities C1, C2 increase in stepwise fashion over a number of steps in association with increase in aperture value is acceptable as well.

G4. Embodiment 4 of Automatic Image Quality Adjustment Process

Figure 16:
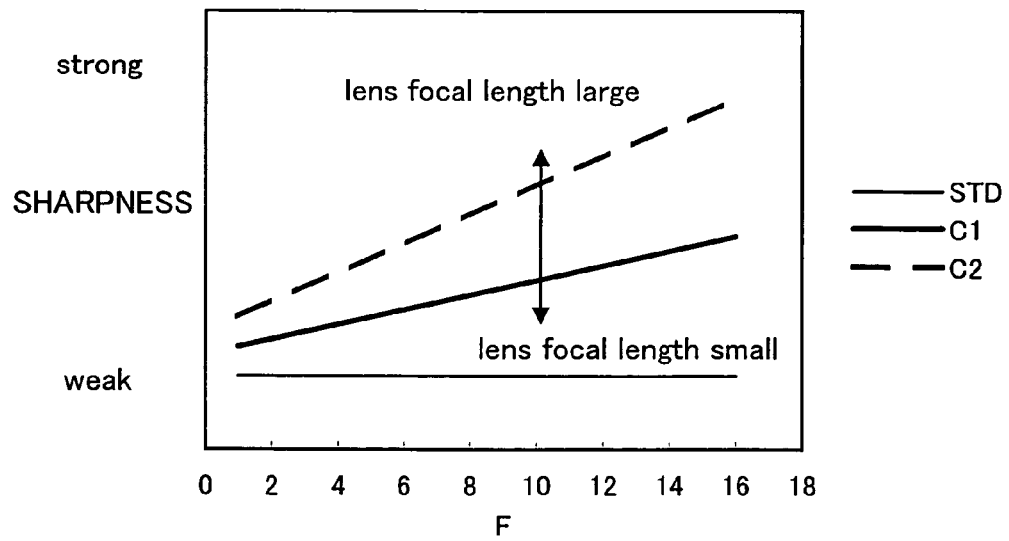
FIG. 16 is an illustration showing the relationship between the degree of sharpness adjustment and aperture value in a fourth embodiment of automatic image quality adjustment processing.

FIG. 16 is an illustration showing the relationship between sharpness intensity and aperture value in a fourth embodiment of automatic image quality adjustment processing. In Embodiment 4, in contrast to Embodiment 1 shown in FIG. 13, high sharpness intensities C1, C2 increase continuously in association with increase in aperture value over the entire range of possible aperture values. By so doing, sharpness enhancement processing can be performed more finely on the basis of aperture value. An arrangement wherein high sharpness intensities C1, C2 increase in stepwise fashion over a number of steps in association with increase in aperture value is acceptable as well.

G5. Embodiment 5 of Automatic Image Quality Adjustment Process

Figure 17:
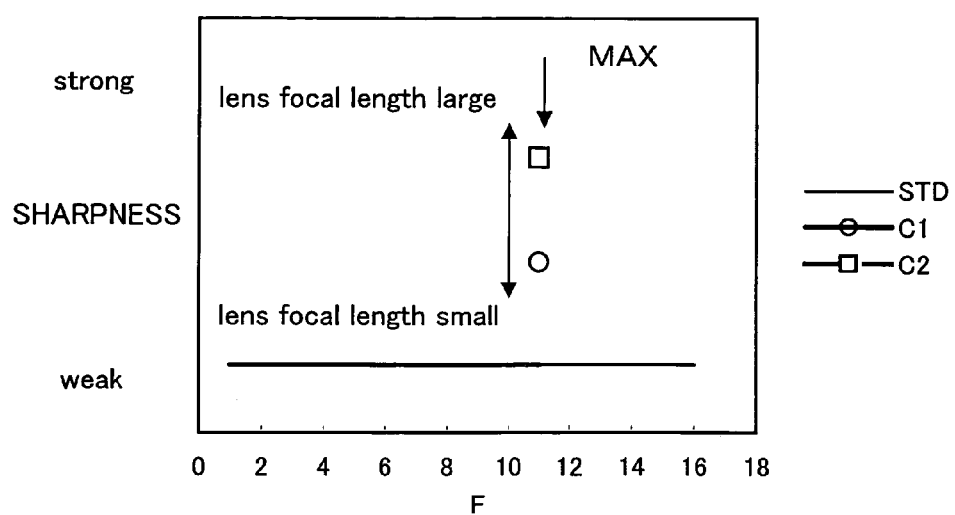
FIG. 17 is an illustration showing the relationship between the degree of sharpness adjustment and aperture value in a fifth embodiment of automatic image quality adjustment processing.

FIG. 17 is an illustration showing the relationship between sharpness intensity and aperture value in a fifth embodiment of automatic image quality adjustment processing. In Embodiment 5, the arrangement is such where aperture value is the maximum value of the aperture value available in the device that generated the image, high sharpness intensities C1, C2 are greater than the standard sharpness intensity STD. For example, in the example shown in FIG. 17, the maximum value for aperture value is 11, and where aperture value is 11, high sharpness intensities C1, C2 are greater than the standard sharpness intensity STD. Thus, by means of the simple operation of setting aperture value to maximum, the user can output sharp images.

The maximum value of aperture value is a value determined depending on the model of digital still camera 12 (more generally, the model of image data generating device). Where image generation information GI in the image file GF includes maximum value of aperture value, CPU 31 (FIG. 7) can acquire this value, and perform adjustment of sharpness intensity depending on the aperture value. Alternatively, an aperture value table comprising combinations of image data generating devices and maximum values of aperture values can be stored in memory such as the PROM 32 (FIG. 7). Where image generation information GI includes as information relating to maximum value of aperture value, for example, maker name and model name, CPU 31 can use the maker name and model name to acquire the maximum value of aperture value from the aperture value table. The aperture table may also be acquired online via a network or the like. By so doing, the aperture value table may be updated appropriately with new information, In this way, as information relating to maximum value of aperture value, information indicating the model of image data generating device (also referred to as image generating device) may be used.

G6. Embodiment 6 of Automatic Image Quality Adjustment Process

Figure 18:
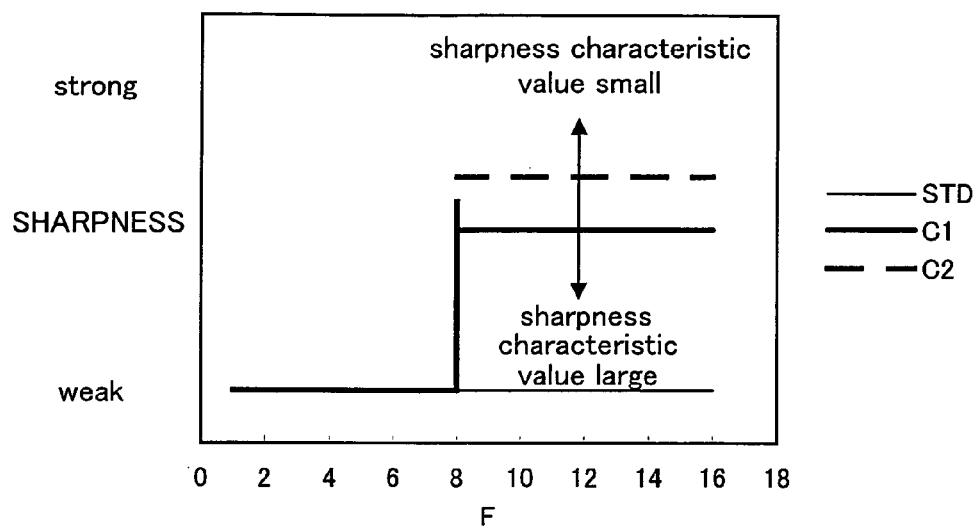
FIG. 18 is an illustration showing the relationship between the degree of sharpness adjustment and aperture value in a sixth embodiment of automatic image quality adjustment processing.

FIG. 18 is an illustration showing the relationship between the degree of sharpness adjustment and aperture value in a sixth embodiment of automatic image quality adjustment processing. The vertical axis shows the degree of sharpness adjustment (hereinafter termed sharpness intensity); a larger value means enhanced sharpness. The horizontal axis shows aperture value F. STD indicates the sharpness intensity of image quality adjustment where aperture value is set under standard shooting conditions of digital still camera 12 (hereinafter termed "standard sharpness intensity"); C1 and C2 indicate sharpness intensity of image quality adjustment where aperture value is set manually (hereinafter termed "high sharpness intensity"). In this embodiment, standard sharpness intensity STD is used where the exposure adjustment mode is either program auto or shutter speed priority mode (Step S430 in FIG. 12), and high sharpness intensity C1 or C2 is used where the exposure adjustment mode is either manual mode or aperture priority mode (Step S420 in FIG. 12). Standard shooting conditions of digital still camera 12 means the default shooting conditions when digital still camera 12 is shipped from the factory, and normally correspond to shooting conditions with program auto. An arrangement wherein, in the case of shutter speed priority mode, image quality adjustment is performed at different sharpness intensity than standard sharpness intensity STD is acceptable as well.

High sharpness intensities C1, C2 are set to be greater than standard sharpness intensity STD when the aperture value is 8 or above. By so doing, when the user has set the aperture value to a large value (small aperture) deliberately for sharper image output, a sharp image can be output effectively. The predetermined value for the aperture value at which high sharpness intensities C1, C2 are greater than standard sharpness intensity STD is not limited to 8; it can be set to any preselected value. For example, by setting it to 4, sharper images can be output, or by setting it, for example, to 11, softer images can be output.

The two high sharpness intensities C1, C2 having different sharpness intensity are preferably used selectively depending on a sharpness characteristic value that indicates a characteristic relating to sharpness of an image represented by image data. The sharpness characteristic value may be an average edge amount for all pixels where the edge amount is defined by an absolute value of a brightness difference between each pixel and a predetermined neighbor pixel. Alternatively, the sharpness characteristic value may be obtained as a weighted average value using heavier weights for pixels with larger edge amounts (i.e. pixels at edges in the image). By analyzing image data and calculating such a sharpness characteristic value, a larger sharpness characteristic value can be obtained for sharper image data. Incidentally, high sharpness intensity C2 is set such that it is greater than high sharpness intensity C1 where aperture value is 8 or above. Accordingly, by performing image quality adjustment using high sharpness intensity C2 on image data whose sharpness characteristic value is relatively small, i.e. whose sharpness is relatively weak, output of blurry images can be reduced. Also, by performing image quality adjustment using high sharpness intensity C1 on image data whose sharpness characteristic value is relatively large, i.e. whose sharpness is relatively strong, excessive adjustment of sharpness can be reduced.

As method of selectively using sharpness intensities C1, C2 depending on the sharpness characteristic value, there is a method of using a threshold value for the sharpness characteristic value. For example, an arrangement wherein high sharpness intensity C2 is used when the sharpness characteristic value is below the threshold value, and high sharpness intensity C1 is used when equal to or greater than the threshold value, is also acceptable. The number of types of high sharpness intensity having different sharpness intensity is not limited to 2; three or more types of high sharpness intensity having different sharpness intensity may be used selectively depending on sharpness characteristic value. By having a greater number of types of high sharpness intensity, setting of sharpness intensity can be performed more finely in response to changes in sharpness characteristic value. Also, sharpness intensity of the high sharpness intensities may be made to change continuously depending on sharpness characteristic value. In any event, it is preferable to set high sharpness intensity so that sharpness intensity decreases with higher sharpness as indicated by the sharpness characteristic value. By so doing, excessive adjustment of sharpness can be reduced, and output of blurry images can be reduced further.

As the standard sharpness intensity STD, a value preset so as to optimize the output result of an image generated under standard conditions of digital still camera 12 (e.g. program auto) can be used. Alternatively, image sharpness can be analyzed on a per-pixel basis, and standard sharpness intensity STD adjusted on a per-pixel basis depending on the analysis results, so as to bring the sharpness characteristic value of an image into approximation with a benchmark value for sharpness. It is also acceptable to set not performing sharpness adjustment as the standard sharpness intensity STD. Where standard sharpness intensity STD is set by any of various methods in this way, high sharpness intensities C1, C2 are set so that they are greater than the set standard sharpness intensity STD when aperture value is set within a predetermined range (in this embodiment, where aperture value is 8 or above).

High sharpness intensities C1, C2 for image quality adjustment at manual settings can be determined by comparing image data on which high sharpness image quality adjustment has been performed, with image data on which standard sharpness image quality adjustment has been performed on the same original image. The comparison may be made on the basis of qualitative determination of image sharpness or sensory test of output results, so as to optimize the output result of the image. For example, for the same set of image data, the output result obtained with the exposure program parameter value set to 3 (aperture priority mode) and the output result obtained with the exposure program parameter value set to 2 (program auto) can be compared to determine optimal sharpness intensity. Some image data generating devices have an operating mode that automatically adjusts various parameter values at the time of image generation to standard values, which are not limited to aperture value or exposure. For those devices, the level of sharpness adjustment intensity can be examined by means of comparing the output results at that operating mode setting with the output results of the same data at the aperture priority mode setting. In this embodiment, image quality adjustment using the same sharpness intensity is performed both where the exposure adjustment mode is manual mode and where it is aperture priority mode, but image quality adjustment could be performed with different sharpness intensities depending on exposure adjustment mode.

Sharpness intensity depending on the magnitude of a sharpness characteristic value may also be set on the basis of qualitative determination of image sharpness or sensory test of output result. For example, image quality adjustment using various different sharpness intensities for a plurality of sets of image data with different sharpness characteristic values may be performed. By comparing the sharpness characteristic values obtained through analysis of the resultant adjusted image data, or output images based on the adjusted image data, sharpness intensity can be set for a particular sharpness characteristic value.

G7. Embodiment 7 of Automatic Image Quality Adjustment Process

Figure 19:
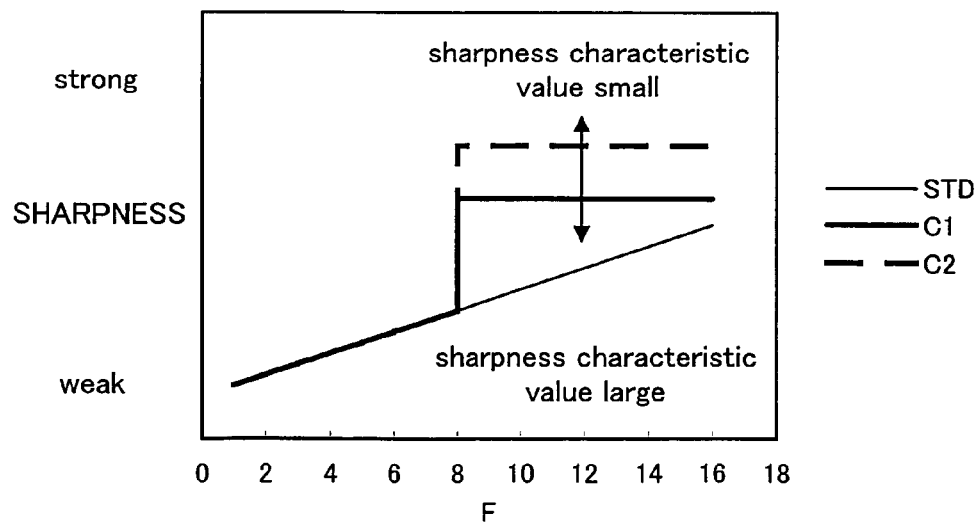
FIG. 19 is an illustration showing the relationship between the degree of sharpness adjustment and aperture value in a seventh embodiment of automatic image quality adjustment processing.

FIG. 19 is an illustration showing the relationship between image quality adjustment sharpness intensity and aperture value in a seventh embodiment of automatic image quality adjustment processing. The meaning of the vertical and horizontal axes, and the meaning of STD, C1, and C2 are the same as in FIG. 18.

Embodiment 7 differs from Embodiment 6 shown in FIG. 18 in that standard sharpness intensity STD increases continuously in association with increase in aperture value. By so doing, differences in sharpness due to aperture value can be reflected on the image even where image quality adjustment is performed at standard sharpness. Additionally, by setting high sharpness intensities C1, C2 to be higher than standard sharpness intensity STD when aperture value is equal to or greater than a predetermined value (8 in this embodiment), it is possible to accommodate user preference for sharper image output. An arrangement wherein standard sharpness intensity STD increases in stepwise fashion over a number of steps in association with increase in aperture value is acceptable as well.

G8. Embodiment 8 of Automatic Image Quality Adjustment Process

Figure 20:
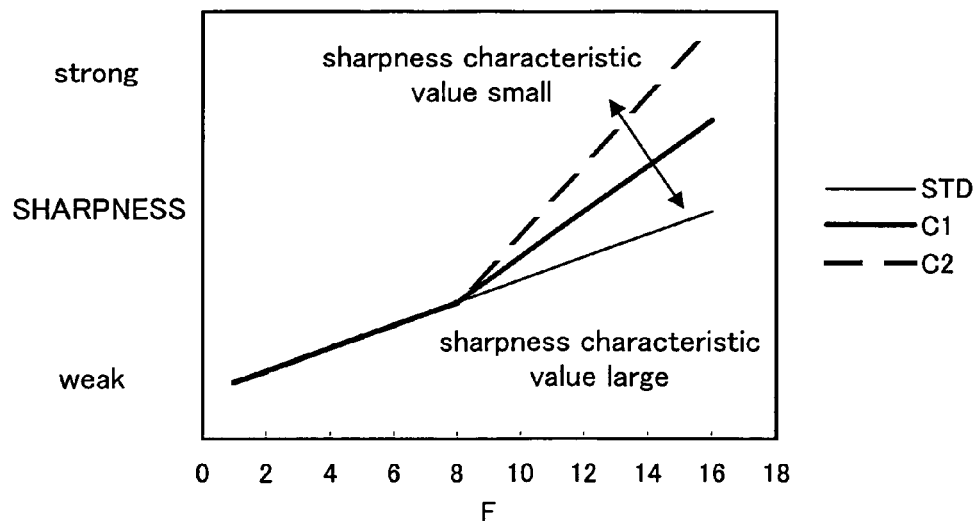
FIG. 20 is an illustration showing the relationship between the degree of sharpness adjustment and aperture value in an eighth embodiment of automatic image quality adjustment processing.

FIG. 20 is an illustration showing the relationship between sharpness intensity and aperture value in an eighth embodiment of automatic image quality adjustment processing. In Embodiment 8, in contrast to Embodiment 6 shown in FIG. 18, high sharpness intensities C1, C2 increase continuously in association with increase in aperture value where aperture value is equal to or greater than a predetermined value (8 in this embodiment). By so doing, sharpness enhancement processing can be performed more finely on the basis of aperture value. An arrangement wherein high sharpness intensities C1, C2 increase in stepwise fashion over a number of steps in association with increase in aperture value is acceptable as well.

G9. Embodiment 9 of Automatic Image Quality Adjustment Process

Figure 21:
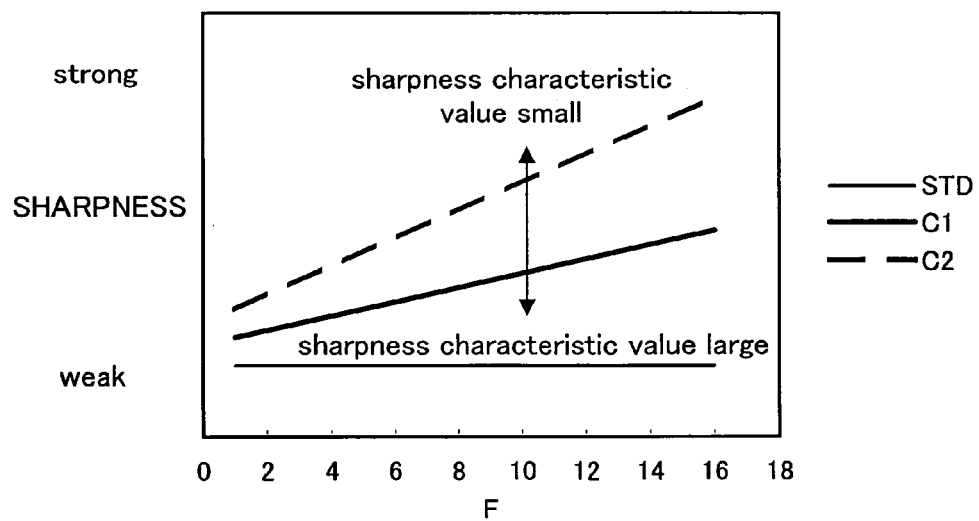
FIG. 21 is an illustration showing the relationship between the degree of sharpness adjustment and aperture value in a ninth embodiment of automatic image quality adjustment processing.

FIG. 21 is an illustration showing the relationship between sharpness intensity and aperture value in a ninth embodiment of automatic image quality adjustment processing. In Embodiment 9, in contrast to Embodiment 6 shown in FIG. 18, high sharpness intensities C1, C2 increase continuously in association with increase in aperture value over the entire range of available aperture values. By so doing, sharpness enhancement processing can be performed more finely on the basis of aperture value. An arrangement wherein high sharpness intensities C1, C2 increase in stepwise fashion over a number of steps in association with increase in aperture value is acceptable as well.

G10. Embodiment 10 of Automatic Image Quality Adjustment Process

Figure 22:
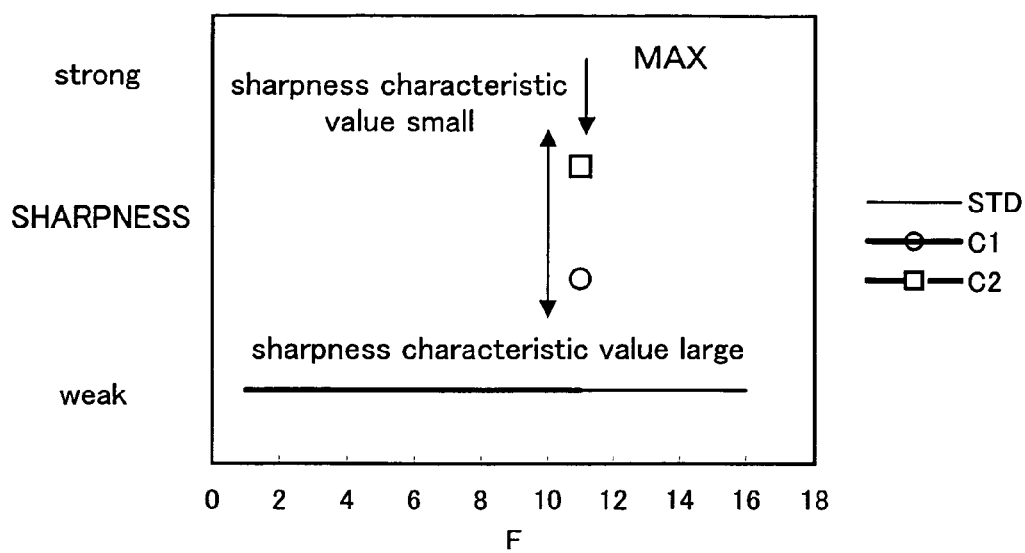
FIG. 22 is an illustration showing the relationship between the degree of sharpness adjustment and aperture value in a tenth embodiment of automatic image quality adjustment processing.

FIG. 22 is an illustration showing the relationship between sharpness intensity and aperture value in a tenth embodiment of automatic image quality adjustment processing. In Embodiment 10, the arrangement is such where aperture value is the maximum value of the aperture value utilizable in the device that generated the image, high sharpness intensities C1, C2 are greater than the standard sharpness intensity STD. For example, in the example shown in FIG. 22, the maximum aperture value is 11, and at that value, high sharpness intensities C1, C2 are greater than the standard sharpness intensity STD. Thus, by means of the simple operation of setting aperture value to its maximum, the user can output sharp images.

The maximum aperture value depends on the model of digital still camera 12 (more generally, the model of image data generating device). Where image generation information GI in the image file GF includes maximum aperture value, CPU 31 (FIG. 7) can acquire this value, and perform adjustment of sharpness intensity depending on aperture value. Alternatively, an aperture value table comprising combinations of image data generating devices and maximum aperture values can be stored in memory such as the PROM 32 (FIG. 7). Where image generation information GI includes as information relating to maximum aperture value, for example, maker name and model name, CPU 31 can use the maker name and model name to acquire the maximum aperture value from the aperture value table. The aperture table may also be acquired online via a network or the like. By so doing, the aperture value table may be updated appropriately with new information, In this way, as information relating to maximum aperture value, information indicating the model of image data generating device (also referred to as image generating device) may be used.

Figure 23:
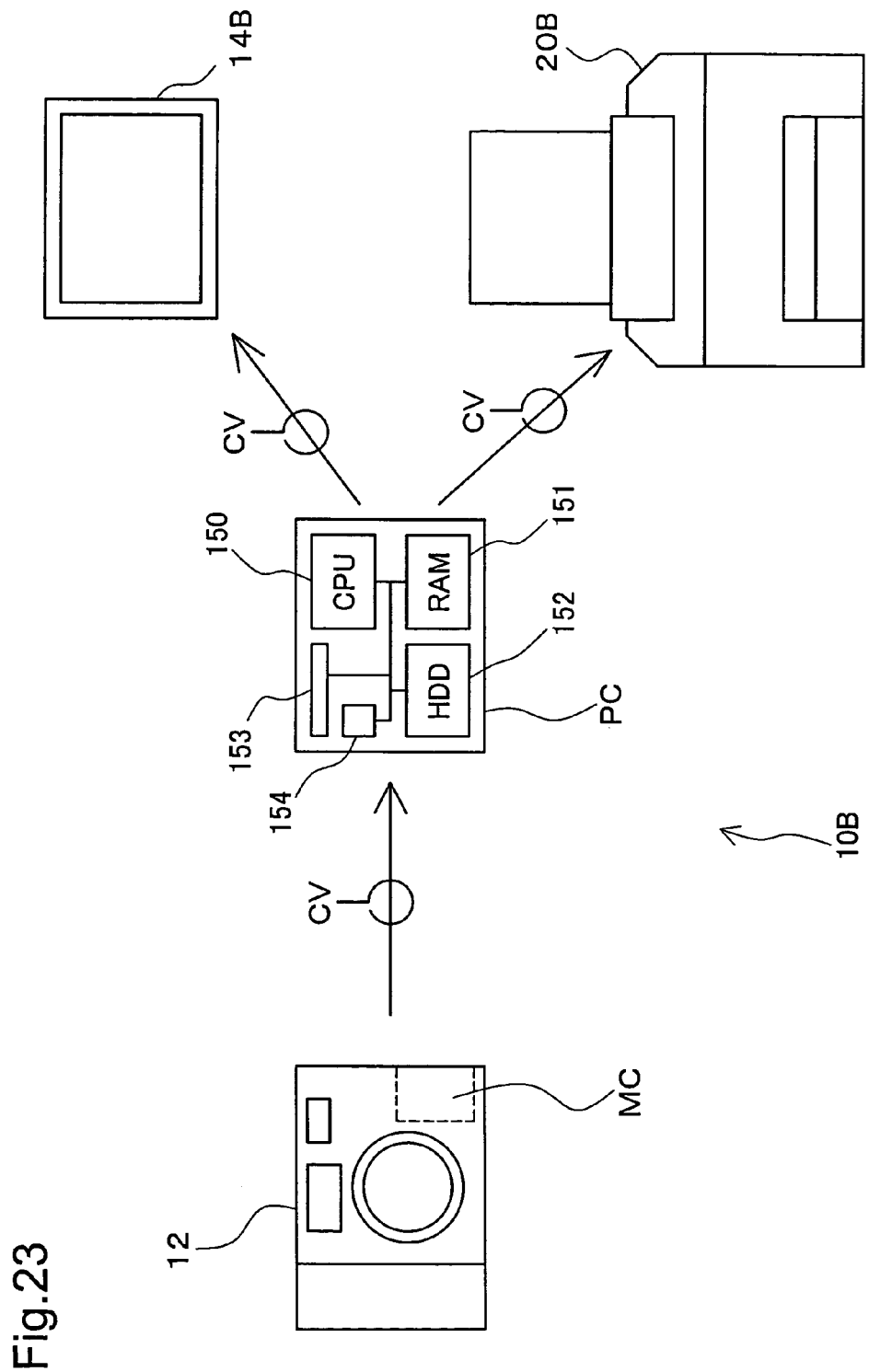
FIG. 23 is an explanatory diagram showing an example of an image data output system in which an image data processing device may be implemented.

H. Arrangement of Image data Output System Employing Image Data Processing Device:

FIG. 23 is an explanatory diagram showing an example of an image data output system in which an image data processing device may be implemented by way of an embodiment of the present invention. Image data output system 10B comprises a digital still camera 12 as an image data generating device for generating image files; a computer PC for executing image quality adjustment processing based on an image file; and a printer 20B as an image output device for outputting image data. Computer PC is of a commonly used type, and functions as an image data processing device (or image processing device). As the image data output device, a CRT display, LCD display, or other monitor 14B, or a projector or the like could be used instead of printer 20B. In the following description, it is assumed that printer 20B is used as the image output device. This embodiment differs from the image data output system embodiment described previously (FIG. 1) in that the image data processing device having an image quality adjuster, and the image data output device having an image output section are constructed independently. The computer PC serving as the image data processing device and the printer having an image output section can be termed an "output device" in the broad sense.

An image file created in digital still camera 12 is transferred to computer PC via a cable CV, or by directly inserting into computer PC a memory card MC having the image file stored thereon. Computer PC executes image quality adjustment processing of the image data based on the read out image file. The image data produced by image quality adjustment processing is transferred to printer 20B via a cable CV, and output by printer 20B.

Computer PC comprises a CPU 150 for executing a program that realizes the aforementioned image quality adjustment processing; RAM 151 for temporarily storing results of operations by CPU 150, image data, and the like; and a hard disk drive (HDD) 152 for storing data needed for image quality adjustment processing, such as an image quality adjustment processing program, lookup table, aperture value table, and the like. CPU 150, RAM 151, and HDD 152 function as an image quality adjuster. Computer PC further comprises a memory card slot 153 for installing a memory card MC; and an input/output terminal 154 for connecting a connector cable from digital still camera 12 or the like.

An image file GF generated by a digital still camera 12 is supplied to computer PC via a cable or via a memory card MC. When an image data processing application program, either an image retouching application or a printer driver, is started up by user control, CPU 150 executes an image processing routine (FIG. 9) to process the read image file GF. Alternatively, the image data processing application program may be set to start up automatically when a memory card MC is inserted into memory card slot 153, or when connection of a digital still camera 12 to input/output terminal 154 via a cable is detected.

Image data processed by CPU 150, rather than being output in Step S250 of the image processing routine (FIG. 9), is instead transferred to an image data output device, for example, printer 20B, whereupon the image data output device receiving the image data executes image output.

At this time, the image-processed image data is transferred by CPU 150 to printer 20B as the image output section. In this embodiment, CPU 150 functions as a "data output section".

In this embodiment, image processing is carried out using an image quality adjuster provided to computer PC, so it is possible to use an image data output device that does not have an image quality adjuster. Where the image data output device is provided with an image quality adjuster, image data may be output to the image data output device without being subjected to image processing on computer PC, and image processing instead carried out by the image quality adjuster of the image data output device.

As described hereinabove, in the preceding embodiments, image quality can be adjusted automatically using image generation information GI included in the image file GF, so output results of high quality that reflect the intent of the user can be obtained with ease. In particular, image data generated at user-adjusted aperture value and lens focal length can be subjected to appropriate sharpness adjustment for output.

The invention is not limited to the embodiments set forth hereinabove, and may be reduced to practice in various modes without departing from the scope and spirit thereof; the following variations are possible, for example.

I. VARIANT EXAMPLES

Figure 24:
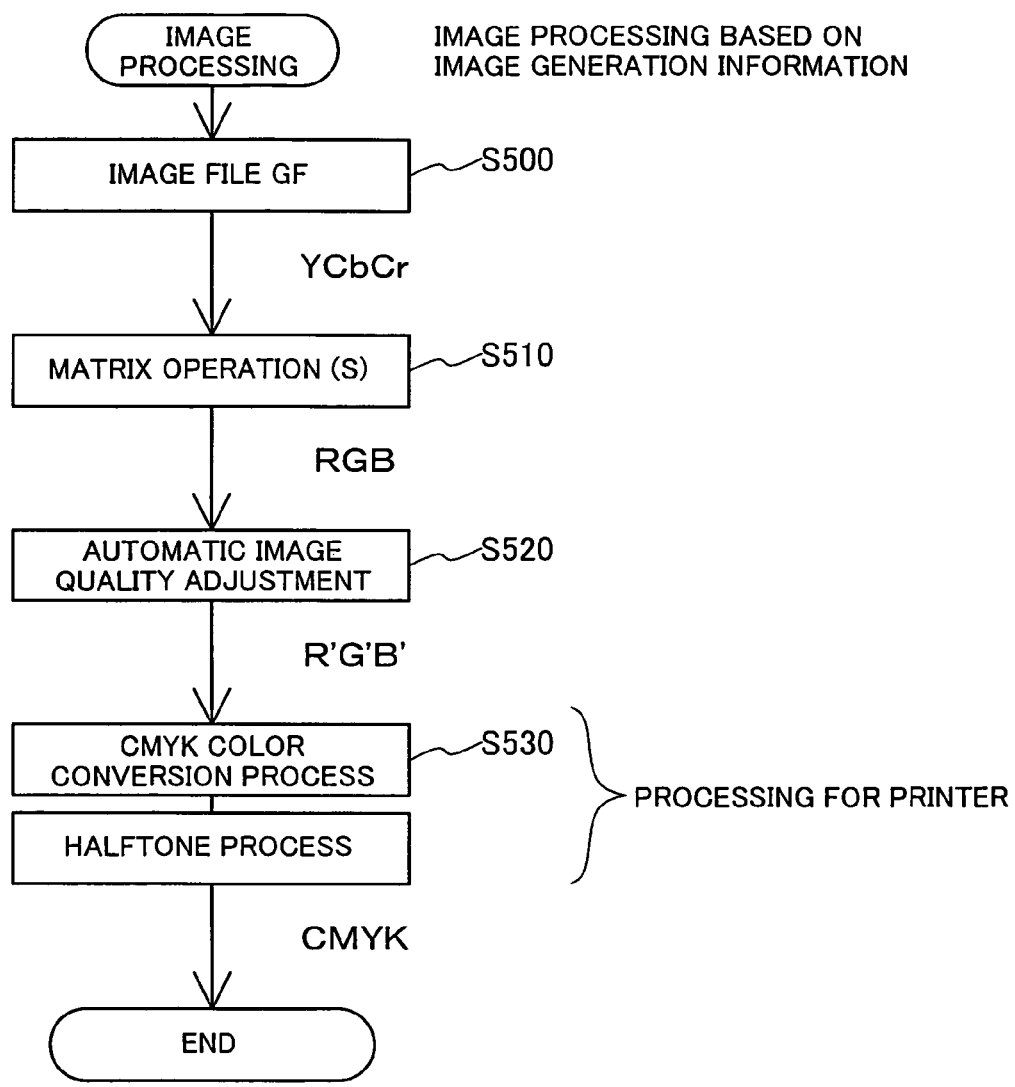
FIG. 24 is a flow chart showing an image processing routine from which the color space conversion process has been omitted.

I1. Variant Example 1

Where an image file GF does not include image data gamma value or color space information, the color space conversion process of the image processing routine shown in FIG. 10 (Step S320 and Step S330) can be omitted. FIG. 24 is a flow chart showing an image processing routine from which the color space conversion process has been omitted. Image data acquired in Step S500 is converted from image data based on a YCbCr color space to data based on an RGB color space in Step S510. Next, in Step S520, automatic image quality adjustment processing is executed using the image data obtained in Step S510. Next, in Step S530, a CYMK conversion process and halftone process for printing are executed.

I2. Variant Example 2

Figure 25:
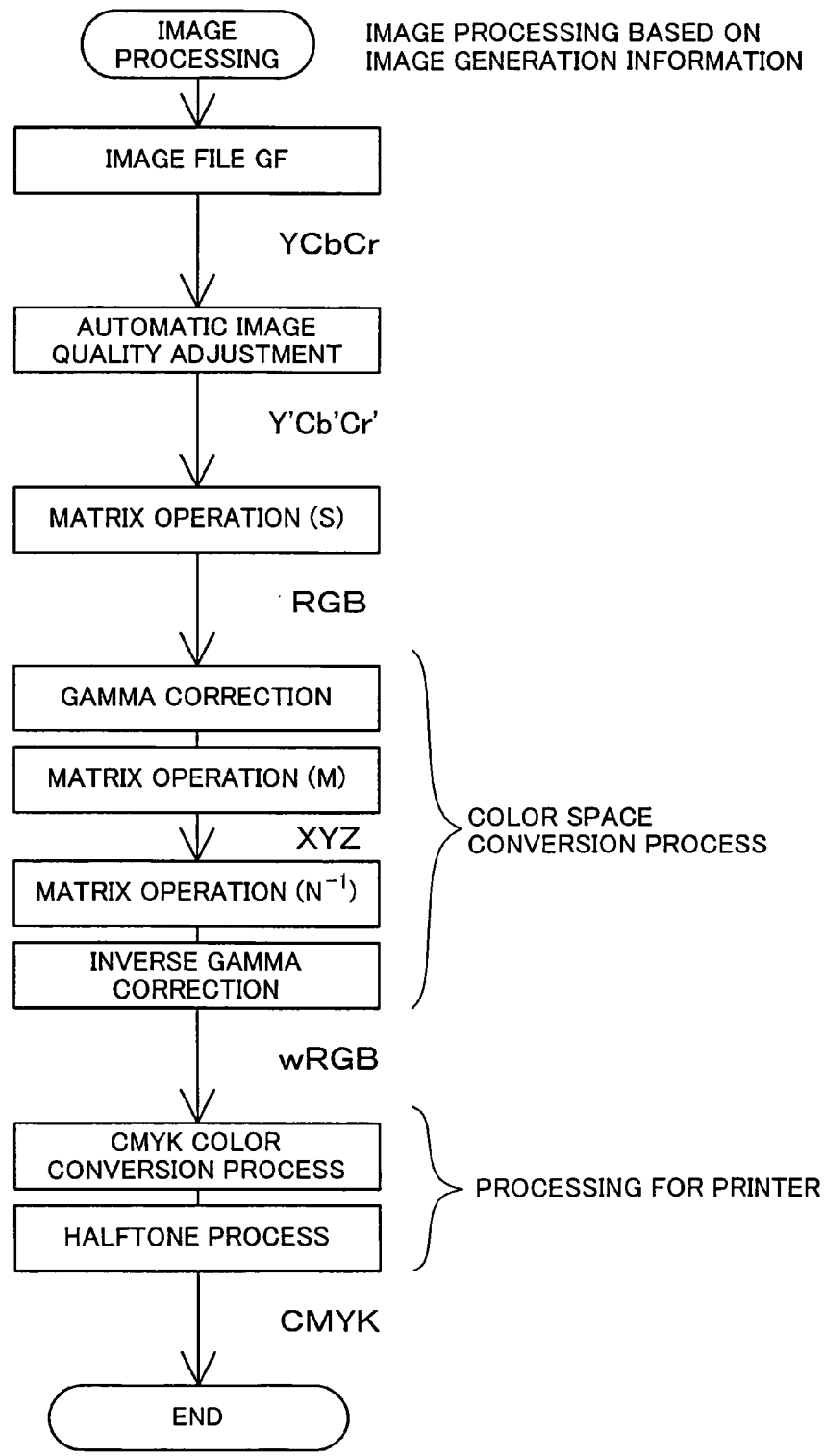
FIG. 25 is a flowchart showing another processing routine for image processing based on image generation information.

In the preceding embodiments, automatic image quality adjustment processing is executed after executing color space conversion, but instead color space conversion can be executed after executing automatic image quality adjustment processing. For example, image processing can be executed according to the flowchart shown in FIG. 25.

I3. Variant Example 3

Figure 26:
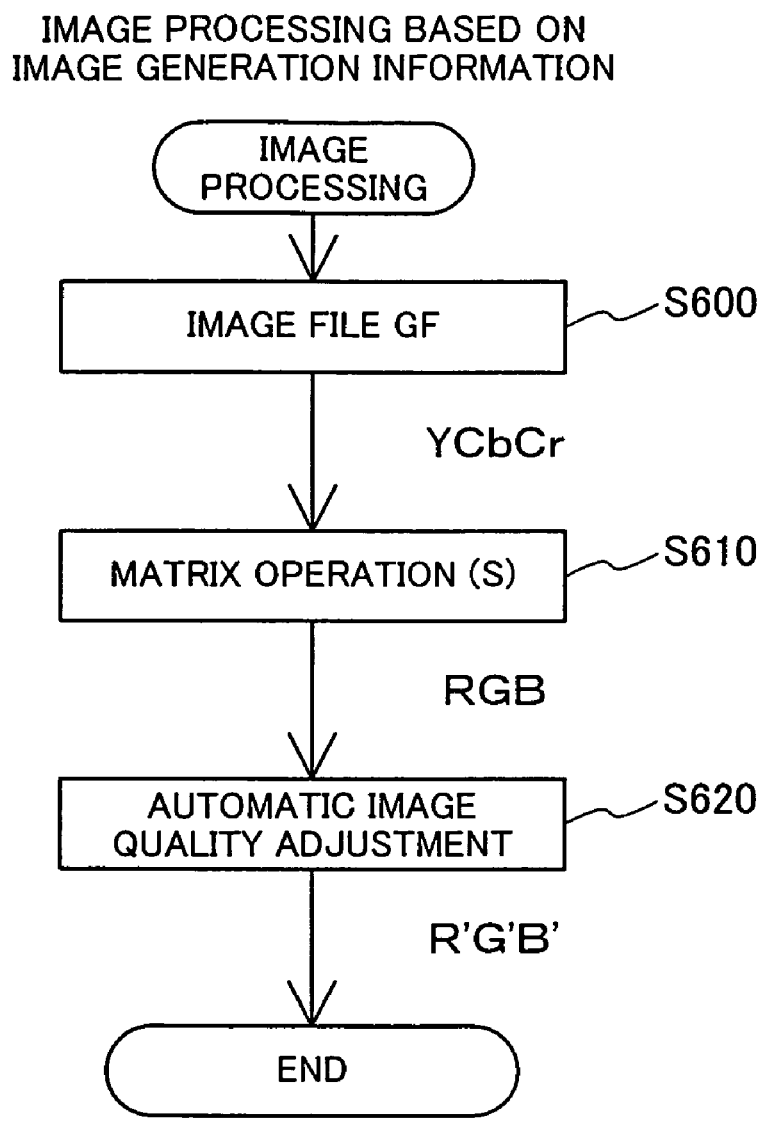
FIG. 26 is a flowchart showing another processing routine for image processing based on image generation information.

In the preceding embodiments, a printer is used as the image output section, but an image output section other than a printer could be used instead. FIG. 26 is a flowchart showing a processing routine for image processing based on image generation information where a CRT is used as the image output section. In contrast to the flowchart in FIG. 10 which depicts the use of a printer as the image output section, the CYMK conversion process and halftone process for printing are omitted. Also, since a CRT can represent an RGB color space of image data obtained by executing a matrix operation (S), the color space conversion process is omitted as well. Where image data based on an RGB color space obtained in Step S610 includes data outside the defined area of the RGB color space, the out-of-defined-area data is clipped, and then step S620 is executed. Where the color space utilizable by an image output section is different from an RGB color space, a color conversion process to a color space utilizable by the image output section is executed in a manner analogous to executing a CMYK color conversion process where a printer is used, and the resultant image is output by the image output section.

I4. Variant Example 4

In the preceding embodiments, as regards images generated in either of the two operating modes in which aperture value is set manually by the user (manual mode and aperture priority mode), identical sharpness adjustment is performed. Alternatively, image quality adjustment at different sharpness intensities can be performed for each of a number of operating modes in which aperture value is set manually. In this case as well, it is arranged that when aperture value is set to a predetermined range of relatively large values, sharpness intensity in each of the operating modes is greater than the standard sharpness intensity STD. The predetermined range of relatively large values may differ by operating mode. By so doing, image quality adjustment appropriate for each operating mode may be performed. Even where there are a number of operating modes in which aperture value is adjusted automatically, image quality adjustment at different sharpness intensity can be performed for each of the different operating modes. For example, where the parameter value for scene type (FIG. 5) as operating mode information is set to human figure mode (portrait mode), it is preferable to perform image quality adjustment at lower sharpness than standard sharpness intensity STD. By so doing, a softer human figure image (portrait) can be output. As regards the relationship of sharpness intensity to aperture value, an arrangement wherein it is weaker than standard sharpness intensity STD regardless of aperture value, or an arrangement wherein it is weaker than standard sharpness intensity STD when aperture value is set to within a predetermined range, is also acceptable. An arrangement wherein image quality adjustment relating to sharpness is not performed is acceptable as well. By so doing, image processing in human figure mode (portrait mode) can be made simple. Where the parameter value for scene type is set to landscape mode for shooting a landscape, it is preferable to perform image quality adjustment at higher sharpness intensity than standard sharpness intensity STD. By so doing, sharper landscape images can be output. In any event, it is preferable for the degree of sharpness adjustment to be higher at greater aperture values.

I5. Variant Example 5

In the preceding embodiments, exposure program and scene type are used as operating mode information, but operating mode information pertaining to the invention is not limited thereto, and may consist of any information that includes information relating to operation of an image generating device at the time of image generation.

I6. Variant Example 6

Sharpness adjustment processing can be executed on all pixels, or may be executed selectively on pixels having relatively large edge amount. By so doing, sharpness adjustment can be performed without correcting pixels that are not considered to be edges in the image. Where sharpness is intensified in sharpness adjustment using an unsharp mask, one is not limited to coefficient G; the degree of sharpness adjustment may be adjusted by adjusting the width of the unsharp mask.

I7. Variant Example 7

In the preceding embodiments, the description was made taking an Exif format file as a specific example of the image file GF, but the format of the image file pertaining to the present invention is not limited to this. That is, any image file containing image data generated by an image data generating device, and image generation information GI describing conditions information at the time of generation of the image data is acceptable. With such a file, image quality of image data generated by an image data generating device can be appropriately adjusted automatically and output from an output device.

I8. Variant Example 8

Values of matrices S, $N^{-1}$, and M in the equations are merely exemplary, and can be modified appropriately depending on color space on which the image file is based, color space utilizable by an image output section, or the like.

I9. Variant Example 9

In the preceding embodiments, the description used a digital still camera 12 as the image generating device, but image files can be generated using a different image data generating device, such as a scanner, digital video camera, or the like. Also, the image data generating device can be designed to be equipped with an image quality adjuster, with the image quality adjuster of the image data generating device executing image processing for carrying out sharpness adjustment on the basis of image generation information, and the processed image data then transferred by the image data generating device directly to an output device, whereupon the output device executes output of an image in response to the received image data.

I10. Variant Example 10

In the preceding embodiments, the description took the example of a case where image data GD and image generation information GI are contained in the same image file GF, but image data GD and image generation information GI need not necessarily be stored within the same file. That is, it is sufficient for image data GD and image generation information GI to be associated with each other; for example, it would be acceptable to generate associating data that associates image data GD with image generation information GI; store one or several sets of image data and image generation information GI in independent files; and refer to the associated image generation information GI when processing the image data GD. This is because, in this case, although the image data GD and image generation information GI are stored in separate files, at the point in time of image processing which utilizes image generation information GI, the image data GD and image generation information GI are in inseparably linked, and thus function substantially the same as if they were stored in the same file. That is, the term image file GF in the present embodiment includes those of a form wherein image data GD and image generation information GI are associated, at least at the point in time that image processing takes place. Also included are motion video files stored on optical disk media such as CD-ROM, CD-R, DVD-ROM, DVD-RAM, and the like.

I11. Variant Example 11

Depending on the image data generating device, in some instances, 35 mm film-converted lens focal length can be used instead of lens focal length information. 35 mm film-converted lens focal length is a value obtained by converting an actual lens focal length to a lens focal length in a camera that uses 35 mm film, under conditions that maintain the ratio of photoreceptor element size to the lens focal length. In such a case, it is preferable to adjust the degree of sharpness adjustment on the basis of 35 mm film-converted lens focal length. Where the photoreceptor element of an image data generating device is relatively small, the effect of diffraction phenomenon and lens chromatic aberration on image data generated is relatively great. As a result, even is the case of the same actual lens focal length, the likelihood of generating image data that outputs a blurred image is higher. Accordingly, by adjusting the degree of sharpness adjustment on the basis of 35 mm film-converted lens focal length, the degree of sharpness adjustment can be adjusted appropriately regardless of the size of the photoreceptor element of the image data generating device.

I12. Variant Example 12

In the preceding embodiments, the digital still camera 12 may execute automatic image quality adjustment processing. For example, in the digital still camera 12 shown in FIG. 2, image processing circuit 123 may be designed to execute automatic image quality adjustment processing. Specifically, image processing circuit 123 executes automatic image quality adjustment processing on image data acquired by means of optical circuit 121 and image acquisition circuit 122. At this time, image processing circuit 123 can use information relating to various shooting conditions (aperture value, etc.) when image data is acquired by circuit 121 and image acquisition circuit 122. Control circuit 124 outputs quality-adjusted image data to liquid crystal display 127, and liquid crystal display 127 displays an image in response to the received image data. In this variant example, image processing circuit 123 corresponds to the "image quality adjuster". Liquid crystal display 127 functions as the "image output section", and control circuit 124 functions as the "data output section". At this time, quality-adjusted image data is preferably stored on a memory card MC. By so doing, even if an output device lacking an image quality adjuster is used, quality-adjusted images can be output. Also, an arrangement wherein digital still camera 12 and an output device serving as the image output section are connected by a cable or by wireless communication, and control circuit of digital still camera 12 transfers quality-adjusted image data to the output device is also acceptable.

I13. Variant Example 13

In the preceding embodiments, an edge amount of a pixel is obtained as a difference in brightness value of pixels in proximity to that pixel location. For example, where pixels are arranged in a grid pattern, the average value or maximum value of the absolute values for brightness difference with eight surrounding pixels may be used as edge amount. However, edge amount can be obtained using another function relating to brightness values or pixels in proximity to that pixel location. Typically, edge amount of a pixel is preferably set to a parameter value that indicates the magnitude of change in brightness value at that pixel location. By so doing, in a sharp image, the boundaries of a subject in an image are distinct, so there is a large number of pixels with high edge amount. As a result, where a sharpness characteristic value is calculated on the basis of edge amount, the resultant sharpness characteristic value can appropriately reflect sharpness of the image represented by image data.

I14. Variant Example 14

In the preceding embodiments, as the sharpness characteristic value, various parameter values other than the average value of the aforementioned edge amount can be used. For example, where pixels having edge amount greater than a predetermined threshold value are termed edge pixels, the proportion of the number of edge pixels to the total number of pixels may be used as the sharpness characteristic value. Typically, it is preferable to use as the sharpness characteristic value a parameter value that is related to sharpness in an image represented by image data.

While the present invention has been described in detail and shown hereinabove, these are given by way of example, and is not limited to these, the spirit and scope of the invention being limited only by the appended claims.

What is claimed is:

1. A method of performing image processing using image data generated by an image generator and image generation information that is associated with the image data and that includes at least aperture information, operating mode information, and lens focal length information at the time of generation of the image data, the method comprising:

executing image quality adjustment to adjusting sharpness of the image data on the basis of the aperture information, the operating mode information, and the lens focal length information included in the image generation information, the executing of the image quality adjustment including obtaining an aperture value used at the time of generation of the image data from the aperture information, and judging whether the aperture value was manually set by a user, and when it is judged that the aperture value was manually set, and when the aperture value is in a predetermined range of at least a portion of an entire possible range of the aperture value, executing sharpness adjustment that is stronger than a case where the aperture value was set under standard shooting conditions of the image generator.

2. A method according to claim 1 wherein the image quality adjustment step includes the steps of:

judging on the basis of the operating mode information whether to execute the image quality adjustment to adjust sharpness of the image data; and when it is judged to execute the image quality adjustment, determining a degree of sharpness adjustment on the basis of the aperture information and the lens focal length information.

3. A method according to claim 1 wherein the image quality adjustment step includes the steps of:

judging on the basis of the operating mode information whether the operating mode in the image generator at the time of generation of the image data is portrait mode or not; and when it is judged that the operating mode is portrait mode, executing a selected one of the following processes:

a) not executing the image adjustment; and b) executing weak sharpness adjustment that is weaker than the case where an aperture value is set under standard shooting conditions of the image generator.

4. A method according to claim 1 wherein the strong sharpness adjustment is executed when the aperture value is equal to or greater than a predetermined value.

5. A method according to claim 1 wherein the degree of sharpness adjustment in the strong sharpness adjustment is set stronger as the aperture value becomes higher.

6. A method according to claim 1 wherein the image generation information further includes information relating to a maximum value of aperture value utilizable in the image data generator that generated the image data, and the strong sharpness adjustment is executed when the aperture value is the maximum aperture value.

7. A method according to claim 1 wherein the degree of sharpness adjustment in the strong sharpness adjustment is set stronger as the lens focal length becomes greater.

8. An image processing device for performing image processing using image data generated by an image generator and image generation information that is associated with the image data and that includes at least aperture information, operating mode information, and lens focal length information at the time of generation of the image data, wherein the image processing device comprises an image quality adjuster that, on the basis of the aperture information, together with the operating mode information and lens focal length information included in the image generation information, adjusts sharpness of the image data, and wherein the image quality adjuster obtains an aperture value used at the time of generation of the image data from the aperture information, and judges whether the aperture value was manually set by a user, and when the image quality adjuster judges that the aperture value was manually set, and when the aperture value is in a predetermined range of at least a portion of an entire possible range of the aperture value, the image quality adjuster executes sharpness adjustment that is stronger than a case where the aperture value was set under standard shooting conditions of the image generator.

9. A computer program product for causing a computer to execute a process for adjusting image quality of image data, using image data generated by an image generator and image generation information that is associated with the image data and that includes at least aperture information, operating mode information, and lens focal length information at the time of generation of the image data, the computer program product comprising:

a computer-readable medium; and a computer program stored on the computer-readable medium, the computer program including a program instructions for causing a computer to execute sharpness adjustment of the image data, on the basis of the aperture information, the operating mode information, and lens focal length information included in the image generation information, the computer program further including program instructions for causing the computer to obtain an aperture value used at the time of generation of the image data from the aperture information, and to judge whether the aperture value was manually set by a user, and when it is judged that the aperture value was manually set, and when the aperture value is in a predetermined range of at least a portion of an entire possible range of the aperture value, to execute sharpness adjustment that is stronger than a case where the aperture value was set under standard shooting conditions of the image generator.

10. A method of performing image processing using image data generated by an image generator and image generation information that is associated with the image data and that includes at least aperture information and operating mode information at the time of generation of the image data, the method comprising the steps of:

analyzing the image data to obtain a sharpness characteristic value indicating a characteristic relating to sharpness of the image represented by the image data; and executing image quality adjustment on the basis of the sharpness characteristic value, the aperture information, and the operating mode information included in the image generation information, to adjust sharpness of the image data, wherein the executing of the image quality adjustment includes obtaining an aperture value used at the time of generation of the image data from the aperture information, and judging whether the aperture value was manually set by a user, and when it is judged that the aperture value was manually set, and when the aperture value is in a predetermined range of at least a portion of an entire possible range of the aperture value, executing sharpness adjustment that is stronger than a case where the aperture value was set under standard shooting conditions of the image generator.

11. A method according to claim 10 wherein the image quality adjustment step includes the steps of:

judging on the basis of the operating mode information whether to execute the image quality adjustment to adjust sharpness of the image data, and when it is judged to execute the image quality adjustment, determining a degree of sharpness adjustment on the basis of the aperture information and the sharpness characteristic value.

12. A method according to claim 10 wherein the image quality adjustment step includes the steps of:
- judging on the basis of the operating mode information whether the operating mode in the image generator at the time of generation of the image data is portrait mode or not; and
- when it is judged that the operating mode is portrait mode, executing a selected one of the following processes:
- a) not executing the image adjustment; and
- b) executing weak sharpness adjustment that is weaker than the case where the aperture value is set under standard shooting conditions of the image generator.

13. A method according to claim 10 wherein the strong sharpness adjustment is executed when the aperture value is equal to or greater than a predetermined value.

14. A method according to claim 10 wherein the degree of sharpness adjustment in the strong sharpness adjustment is set stronger as the aperture value becomes higher.

15. A method according to claim 10 wherein the image generation information further includes information relating to a maximum value of aperture value utilizable in the image data generator that generated the image data, and
- the strong sharpness adjustment is executed when the aperture value is the maximum aperture value.

16. A method according to claim 10 wherein the degree of sharpness adjustment in the strong sharpness adjustment is set weaker as the sharpness indicated by the sharpness characteristic value becomes stronger.

17. An image processing device for performing image processing using image data generated by an image generator and image generation information that is associated with the image data and that includes at least aperture information and operating mode information at the time of generation of the image data, wherein
- the image processing device comprises an image quality adjuster that analyzes the image data to obtain a sharpness characteristic value indicating a characteristic relating to sharpness of the image represented by the image data, and that adjusts the sharpness of the image data on the basis of the sharpness characteristic value, together with the aperture information and the operating mode information included in the image generation information, and wherein the image quality adjuster obtains an aperture value used at the time of generation of the image data from the aperture information, and judges whether the aperture value was manually set by a user, and when the image quality adjuster judges that the aperture value was manually set, and when the aperture value is in a predetermined range of at least a portion of an entire possible range of the aperture value, the image quality adjuster executes sharpness adjustment that is stronger than a case where the aperture value was set under standard shooting conditions of the image generator.

18. A computer program product for causing a computer to execute a process for adjusting image quality of image data, using image data generated by an image generator and image generation information that is associated with the image data and that includes at least aperture information and operating mode information at the time of generation of the image data, the computer program product comprising:
- a computer-readable medium; and
- a computer program stored on the computer-readable medium, the computer program comprising:
- a first program for causing a computer to analyze the image data to obtain a sharpness characteristic value indicating a characteristic relating to sharpness of the image represented by the image data; and
- a second program for causing the computer to adjust the sharpness of the image data on the basis of the sharpness characteristic value, together with the aperture information and the operating mode information included in the image generation information, the second program further causing the computer to obtain an aperture value used at the time of generation of the image data from the aperture information, and to judge whether the aperture value was manually set by a user, and when it is judged that the aperture value was manually set, and when the aperture value is in a predetermined range of at least a portion of an entire possible range of the aperture value, to execute sharpness adjustment that is stronger than a case where the aperture value was set under standard shooting conditions of the image generator.

* * * * *